(12) United States Patent
McArthur et al.

(10) Patent No.: US 11,816,425 B2
(45) Date of Patent: Nov. 14, 2023

(54) COMPUTER SYSTEM AND METHOD FOR PROCESSING DIGITAL FORMS

(71) Applicant: LockDocs Inc., Toronto (CA)

(72) Inventors: Susan Jane McArthur, Toronto (CA); Annigje Martha Stetler, Toronto (CA); Jack Selkirk McArthur Reford, Toronto (CA); Wallace Trenholm, Etobicoke (CA)

(73) Assignee: LockDocks Inc., Toronto (CA)

( * ) Notice: Subject to any disclaimer, the term of this patent is extended or adjusted under 35 U.S.C. 154(b) by 0 days.

(21) Appl. No.: 17/698,788

(22) Filed: Mar. 18, 2022

(65) Prior Publication Data

US 2022/0300703 A1 Sep. 22, 2022

Related U.S. Application Data

(60) Provisional application No. 63/163,313, filed on Mar. 19, 2021.

(51) Int. Cl.
*G06F 40/174* (2020.01)
*G06F 16/335* (2019.01)
*G06F 40/186* (2020.01)

(52) U.S. Cl.
CPC .......... *G06F 40/174* (2020.01); *G06F 16/335* (2019.01); *G06F 40/186* (2020.01)

(58) Field of Classification Search
CPC ..... G06F 40/174; G06F 40/186; G06F 16/335
See application file for complete search history.

(56) References Cited

U.S. PATENT DOCUMENTS

| | | | |
|---|---|---|---|
| 6,490,601 B1 * | 12/2002 | Markus | G06Q 50/188 709/219 |
| 7,257,581 B1 * | 8/2007 | Steele | G06Q 30/06 707/999.009 |

(Continued)

FOREIGN PATENT DOCUMENTS

| | | | | |
|---|---|---|---|---|
| CA | 2240488 A1 * | 6/1997 | | |
| CA | 2795540 A1 * | 5/2000 | ........... | G06F 16/335 |

(Continued)

OTHER PUBLICATIONS

CIPO as ISA, International Search Report and Written Opinion for PCT/CA2022/050412, dated Jun. 24, 2022.

*Primary Examiner* — Shahid K Khan
(74) *Attorney, Agent, or Firm* — Own Innovation Inc.; James W. Hinton

(57) ABSTRACT

Computer systems and computer-implemented methods for processing digital forms are provided. The method includes receiving, at a computer server, a form content request from a requesting party user device. The form content request specifies a requesting party user, a form template, and a data owner user. The computer server confirms permission from the data owner user for the requesting party user to access a universal profile of the data owner user to obtain form content data corresponding to the form template. The universal profile comprises an instance of a universal profile data structure. Upon confirming the permission, the form content request is fulfilled by the computer server. Fulfilling the form content request includes obtaining the form content data from the universal profile using a mapping of the form template to the universal profile data structure and provisioning access to the form content data to the requesting party user.

20 Claims, 17 Drawing Sheets

(56) References Cited

U.S. PATENT DOCUMENTS

| | | | |
|---|---|---|---|
| 8,595,230 B1 | 11/2013 | Djabarov | |
| 8,978,116 B1* | 3/2015 | Spertus | H04N 21/44213 |
| | | | 726/20 |
| 9,081,756 B2 | 7/2015 | Maxwell et al. | |
| 9,449,181 B1* | 9/2016 | Umapathy | H04L 63/102 |
| 10,229,100 B1 | 3/2019 | Lesner et al. | |
| 10,855,802 B2* | 12/2020 | Bellinger | G06Q 50/01 |
| 10,942,959 B1* | 3/2021 | Haider | G06F 21/6218 |
| 2002/0035501 A1* | 3/2002 | Handel | G06Q 30/0225 |
| | | | 705/7.34 |
| 2002/0184535 A1* | 12/2002 | Moaven | G06F 21/6218 |
| | | | 726/17 |
| 2003/0074456 A1* | 4/2003 | Yeung | H04L 9/40 |
| | | | 709/219 |
| 2003/0140044 A1* | 7/2003 | Mok | G16H 30/20 |
| 2004/0117322 A1* | 6/2004 | Bjorksten | G06Q 30/06 |
| | | | 705/80 |
| 2008/0071808 A1* | 3/2008 | Hardt | G06F 40/174 |
| 2009/0132395 A1* | 5/2009 | Lam | G06F 16/9535 |
| | | | 705/30 |
| 2010/0100950 A1* | 4/2010 | Roberts | H04L 63/08 |
| | | | 709/229 |
| 2010/0199162 A1 | 8/2010 | Boucard | |
| 2011/0320505 A1* | 12/2011 | Jung | G06F 16/437 |
| | | | 707/812 |
| 2012/0143958 A1 | 6/2012 | Augustine | |
| 2013/0104022 A1* | 4/2013 | Coon | G06F 40/174 |
| | | | 715/226 |
| 2013/0282894 A1* | 10/2013 | Barak | G06F 16/958 |
| | | | 709/224 |
| 2014/0101434 A1* | 4/2014 | Senthurpandi | G06F 21/32 |
| | | | 713/150 |
| 2014/0122497 A1* | 5/2014 | Eigner | G06F 16/285 |
| | | | 707/740 |
| 2014/0172447 A1* | 6/2014 | Hardy | G07F 9/001 |
| | | | 705/2 |
| 2014/0298151 A1* | 10/2014 | Fitzpatrick | G06F 40/186 |
| | | | 715/226 |
| 2015/0205776 A1* | 7/2015 | Bhatia | G06Q 30/02 |
| | | | 715/224 |
| 2015/0248392 A1* | 9/2015 | Watanabe | G06F 16/955 |
| | | | 715/226 |
| 2016/0062972 A1* | 3/2016 | Ramakrishnan | G06F 40/186 |
| | | | 715/226 |
| 2017/0048340 A1* | 2/2017 | Zhang | G06F 16/335 |
| 2017/0083954 A1* | 3/2017 | Kurtz | G06Q 50/01 |
| 2017/0249592 A1* | 8/2017 | Rossi | G06F 40/174 |
| 2017/0262421 A1* | 9/2017 | Yue | H04L 63/00 |
| 2017/0287091 A1* | 10/2017 | Harrell | H04L 63/104 |
| 2017/0357627 A1* | 12/2017 | Peterson | G06F 3/0488 |
| 2018/0211005 A1* | 7/2018 | Allen | G16H 10/60 |
| 2019/0156292 A1 | 5/2019 | Wehrle et al. | |
| 2019/0253431 A1* | 8/2019 | Atanda | G06F 21/62 |
| 2019/0286832 A1* | 9/2019 | Szeto | H04W 12/082 |
| 2020/0034927 A1* | 1/2020 | Smith | G06Q 20/102 |
| 2020/0211031 A1 | 7/2020 | Patil | |
| 2020/0382510 A1* | 12/2020 | Dunjic | H04L 63/04 |
| 2021/0103649 A1* | 4/2021 | Korus | H04L 63/102 |
| 2022/0129577 A1* | 4/2022 | Joshy | G06F 21/645 |

FOREIGN PATENT DOCUMENTS

| | | | | |
|---|---|---|---|---|
| CA | 2813758 A1 | * | 4/2012 | ........ G06F 21/6245 |
| CA | 3069735 A1 | * | 8/2020 | ........... G06F 40/174 |
| CA | 2889996 C | * | 12/2020 | ............. G06F 16/00 |
| EP | 2389659 B1 | | 5/2018 | |
| GB | 2606581 A | * | 11/2022 | ............. G06Q 20/02 |
| JP | 2004517532 A | * | 6/2004 | |
| JP | 2015165395 A | | 9/2015 | |
| RU | 2602789 C2 | * | 11/2016 | |
| WO | WO-0152076 A1 | * | 7/2001 | ........... G06F 17/243 |
| WO | 2016076901 A1 | | 5/2016 | |
| WO | 2018175157 A1 | | 9/2018 | |

\* cited by examiner

COMPUTER SYSTEM AND METHOD FOR PROCESSING DIGITAL FORMS

TECHNICAL FIELD

The following relates generally to processing digital forms, and more particularly to computer systems and methods for processing digital forms using a universal data profile.

INTRODUCTION

Forms are a convenient and ubiquitous way of collecting information from a respondent (or data owner) about an entity. Generally, the respondent is who the form is seeking information from (e.g. an individual, a corporation) and the entity is who or what that sought information is about. The entity may be a person, an organization, or a corporation. In some cases, the entity may be the respondent. The entity may be an object or asset, or even an operation. Regardless of the format of the form (e.g. paper, electronic), the process of filling out forms can be tedious, time-consuming, and repetitive. This is particularly true for individuals in positions which require them to fill out numerous forms, often the same forms on a continuing basis which collect the same information which has not changed or, if it has changed, has only changed slightly. Relying parties, which are those parties who seek the information inputted into the form, also have to deal with issues concerning the storage and handling of the data inputted into forms by the person. Often the information collected by the form is sensitive, confidential, or personal in nature and may be subject to regulations regarding its treatment.

For example, directors and officers of companies in regulated industries like banks or insurance companies often must complete forms to be submitted to their jurisdictional regulator (OFSI, TSX, PRA, CBI, OSC, SEC, etc.). These forms often include the same types of information across industries and jurisdictions, including name, addresses (for the last 10 years), professional designations, history of bankruptcies, etc.

The relying party of these forms (and attachments, if required, such as passport, driver's license, etc.), in this case the regulated company and ultimately the regulator, must review the information for accuracy and completeness and transfer the data to the respective regulatory body. This process must be completed annually. The corporate secretariat of the regulated company employs paralegals to compile, complete and file these documents. It is repetitive, expensive and time consuming. It also provides an additional pain point regarding personal data and privacy compliance.

In another example, subscription documents for private investments can be cumbersome to fill out for investors and cumbersome for investment managers to review. In addition to filling out relevant data, investors must provide supporting documentation (passports for individuals, tax forms, articles of incorporation for corporations), as well as answer questions regarding accredited investor and tax status. Because the forms accommodate all types of investors, form content is not customized based on the investor's facts and circumstances and is therefore lengthy and confusing. The investment manager (the relying party) has to review the documents for accuracy and completeness, transfer the data to their accounting and customer relationship management ("CRM") systems, conduct compliance activities including Know Your Customer ("KYC") and anti-money laundering ("AML") procedures, and ensure the investment manager will be able to comply with tax authority requirements often for multiple jurisdictions.

Accordingly, there is a need for an improved system and method for processing forms and information collected by forms that overcomes at least some of the disadvantages of existing systems and methods.

SUMMARY

A computer system for processing digital forms is provided. The system includes: a requesting party user device configured to: receive, via a user interface executing at the requesting party device, a form content request specifying a data owner user and a form template and transmit the form content request to a computer server via a first communication interface. The system includes a data owner user device configured to: receive, via a user interface executing at the data owner device, universal profile population input data for populating a universal profile instance of a universal profile data structure and access permission data authorizing the requesting party to access the universal profile instance to obtain form content data corresponding to the form template; and transmit the universal profile population input data and the access permission data to the computer server via a second communication interface. The system includes the computer server configured to: store a mapping of the form template to the universal profile data structure; store the universal profile instance populated using the universal profile population input data; and upon confirming the authorization of the requesting party to access the universal profile instance using the access permission data, fulfill the form content request including obtaining the form content data from the universal profile instance using the mapping and provisioning access to the form content data to the requesting party user.

The universal profile instance may be stored by the computer server such that the universal profile instance is a single source of truth for the form content data in the system.

Data in the universal profile instance may be stored as source data in a single location in the system with links or mappings to the source data, and access to the source data may be granted or revoked by the data owner user.

The computer server may store the universal profile instance as a single source of truth for data in the universal profile instance using a distributed database system configured to proxy requests and access to an original provider of the source data.

The computer server may provision the access to the form content data by reference and not by copy so that the universal profile instance functions as a single authoritative source in the system for data contained in the universal profile instance.

The universal profile data structure may comprise a plurality of element attribute specifications mapped to a set of form templates which includes the form template.

The computer server may be further configured to generate the mapping by automatically segmenting a form into form fields mapped to the universal profile data structure.

The computer server may be further configured to determine and store a completion state of the universal profile instance and determine from the completion state unpopulated data items in the universal profile instance.

The universal profile data structure may comprise a system-wide data ontology.

The system-wide data ontology may have a tree-like structure including a plurality of nodes, and the nodes may be populated with the universal profile population input data to populate the universal profile instance.

The universal profile data structure may function as a canonical source of truth on how to structure form content data in the system.

The computer server may be further configured to: compare required form content data for the form template to a completion state of the universal profile instance to determine if any of the required form content data is absent from the universal profile instance; send a request for absent form content data to the data owner device; receive additional universal profile population input data corresponding to the absent form content data from the data owner user device; update the universal profile instance of the content provider user using the additional universal profile population input data; and fulfill the form content request using the updated universal profile instance.

A computer-implemented method for processing digital forms is provided. The method includes receiving, at a computer server, a form content request from a requesting party user device, the form content request specifying a requesting party user, a form template, and a data owner user. The method further includes confirming, by the computer server, permission from the data owner user for the requesting party user to access a universal profile of the data owner user to obtain form content data corresponding to the form template, the universal profile comprising an instance of a universal profile data structure. The method further includes, upon confirming the permission, fulfilling the form content request by the computer server including: obtaining the form content data from the universal profile using a mapping of the form template to the universal profile data structure; and provisioning access to the form content data to the requesting party user.

Confirming the data owner permission may include receiving an authorization from a data owner user device at the computer server or referencing, by the computer server, a preexisting permission previously provided by the data owner device and stored by the computer server.

The provisioning access to the form content data may include verifying the form content data at the computer server according to a set of predetermined verification rules and sending a verification confirmation from the computer server to the relying party user device.

The provisioning access to the form content data may include auto populating the form template with the form content data to generate a completed form.

The provisioning access to the form content data may include providing the form content data to the requesting party user in a format directly consumable by a data processing system of the requesting party using the form mapping.

The method may further include: determining and storing a completion state of the universal profile; comparing required form content data for the form template to the completion state of the universal profile to determine if any of the required form content data is absent from the universal profile instance; and sending a request for the absent form content data to the data owner device.

The method may further include: receiving, at the computer server, universal profile population input data corresponding to the absent form content data from the data owner device; updating, by the computer server, the universal profile using the universal profile population input data; and fulfilling the form content request using the updated universal profile by the computer server.

A computer system for processing digital forms is also provided. The computer system includes one or more processors. The one or more processors are configured to: generate and store a form mapping of a form template to a universal profile data structure, the form template comprising a plurality of form fields for collecting form content data; receive a form content request from a requesting party user specifying a data owner user and the form template; receive permission data from the data owner user authorizing the requesting party user to access a universal profile of the data owner user to obtain form content data corresponding to the form template, the universal profile comprising an instance of a universal profile data structure; and upon confirming the authorization of the requesting party to access the universal profile using the permission data, fulfill the form content request including obtaining the form content data from the universal profile using the form mapping and provisioning access to the form content data to the requesting party user.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
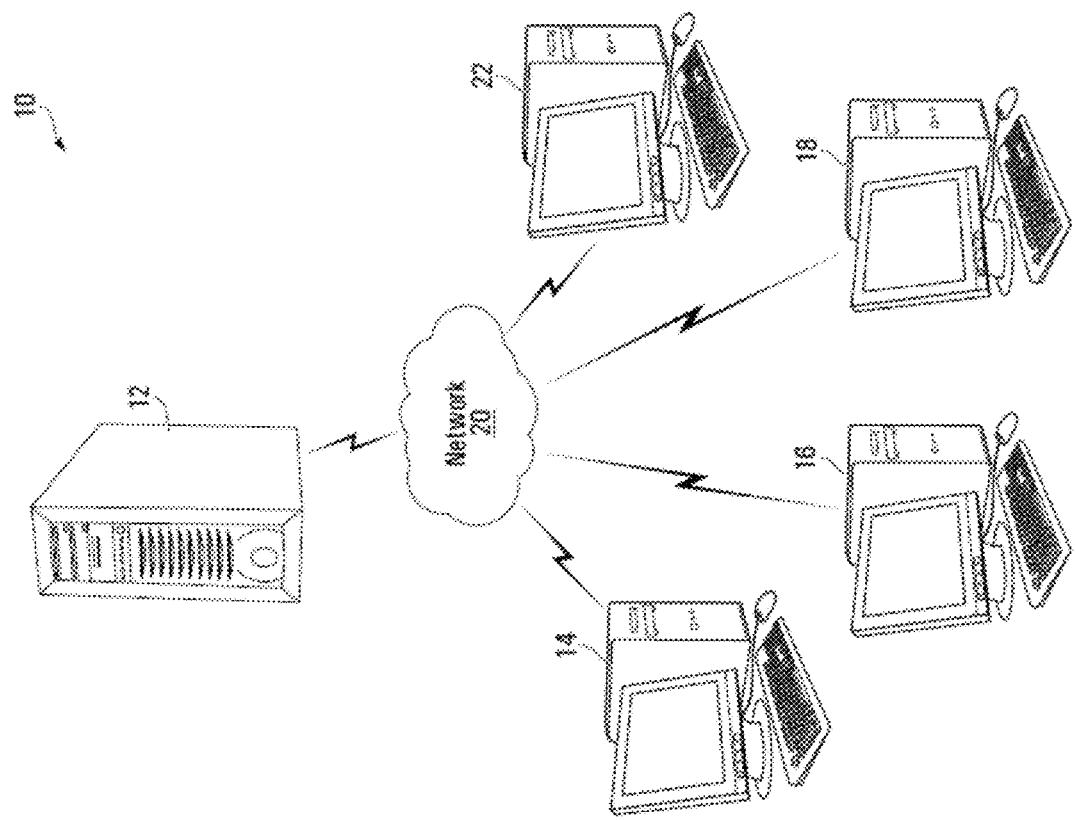
FIG. 1 is a schematic diagram of a system for processing business and personal data structured forms, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The present disclosure provides a computer system and method for processing digital forms. The system stores a universal profile of a "data owner" (or "form content provider". The universal profile stores data about the data owner user (e.g. personal, professional, social information, or other situation-specific or entity-specific data) that may be used to fill out forms. The system also stores form templates. Form templates are uncompleted or unfilled versions of forms (i.e. forms lacking form content that is to be provided by the subject of the form). The form templates may be mapped to a universal profile data structure of which the universal profile is an instance. The system manages access to the universal profile by requesting party users who seek to obtain information stored in the universal profile for the purposes of collecting form content data (i.e. information that can be used to complete or fill out a form template in the system). The system controls requesting party access to the universal profile and permission to access the universal profile is provided by the data owner user. The universal profile may advantageously provide a "single source of truth" (or "SSOT") for information about the data owner user (or other entity that may be the subject of a form to which the data owner user may respond) for the purposes of providing content data to facilitate the "filling out" of forms. In doing so, the system may facilitate a one-to-many relationship between the data owner user and requesting party users seeking information from the data owner user to fill out their respective form. This one-to-many relationship aspect of the system may provide improvements over traditional approaches to form completion which are generally one-to-one relationships between the requesting party and the data owner user, which make the form completion process more complex, particularly for the data owner user.

In aspect, the present disclosure provides systems and methods for personal and business data structured forms.

The system may include a data ontology framework. The system maps form data to a defined schema architecture and specification. The data ontology may be represented as an object model. The system may control and manipulate the object model via a user interface ("UI") or application programming interface ("API"). The system may implement promotion and governance mechanisms for the object models. The system may include a metadata driven UI system based on the ontology framework.

The system may include a form mapping agent architecture for ontology mapped personal and business data structured forms. The form mapping agent may use machine learning (machine-learning driven). The system may automatically segment arbitrary forms (e.g. images, PDFs, document files, etc.) into fields mapped to an ontology data structure. The system may convert binary documents to element objects. Conversion may include translation, mapping, and segmentation processes. The system may include a user interface and APIs for the conversion process to create bins and repositories and have them converted into element objects.

The system may include a data custodian system for holding personal and business data structured forms. The system may hold data produced by an ontology or universal profile data structure system as a custodian on behalf of a user (data owner user). The system may use active consent and authorized governance rights to populate structured form data as requested by relying parties running a mapping agent that are authorized by the user. The system may perform interactions and data exchange between requesting party users and data owner users under a specific custodial context. Under the specific custodial context, the data owner user may maintain all ownership of their data. The data custodian system grants access to relying parties as defined in a governance specification. The governance specification may be referenced in metadata of an element object descriptor.

The system may include an incremental workflow user interface for populating a data ontology. The workflow may allow a user to engage in a given form mapped by a mapping agent. The workflow may provide an incremental and user friendly process for the user to populate a universal profile. The user interface may facilitate user interaction with element attributes and element attribute descriptors to populate the universal profile. The user interface may implement a dynamic conversation and interaction between the data owner user and the data custodian to facilitate collecting user information to hold in trust as a universal profile and providing access to the universal profile to requesting party users according to the terms of the relevant data governance specifications.

The system provides a user interface through which a data owner user can provide permissioned access to their universal profile (or a subset of the information contained therein) to a requesting party seeking access to the universal profile to complete a form. The system fulfils form content requests from relying parties based on the stored access permissions. In this way, the data owner user is not required to fill out the form himself or herself; rather, the data owner user provides input data to populate a universal profile and the system "completes the form" using the universal profile. In doing so, the system reduces the burden on the data owner user in providing form content to the requesting party. This is particularly advantageous in situations where the data owner user needs to provide the same or similar information to multiple relying parties (via multiple forms, which may be the same or different) or to the same requesting party multiple times (such as in yearly submissions of information or the like).

In an aspect, a form processing system is provided that includes a data custodian. The custodian is configured to implement an automated process whereby the custodian converses with the data owner user. The custodian gathers data owner information (or other data to be stored in a universal data profile related to an entity other than the data owner) via the automated process to hold in trust. The received data owner information may be stored as a universal profile. The universal profile may be an instance of a universal profile data structure class, which may be based on or in the form of a data ontology.

In an aspect, the present disclosure provides a form processing system including a data ontology for a corpus of business and personal forms. The corpus' data is represented in the ontology data structure. The ontology data structure may be configured in a tree format. The ontology data structure may have a completion state indicating a state of completion (i.e. population) of the ontology data structure for a particular user (i.e. an instance of the ontology data structure associated with a data owner user). The completion state may be represented in the system as the boundary between the populated data items and the unpopulated data items in the universal profile instance. In an embodiment employing a tree like structure, the completion state may be represented as the boundary between the populated data items at the root of the tree and the unpopulated data items at the leaves of the tree. The completion state may be utilized by the system to facilitate data custodian functionality (e.g. knowing what data is required from the data owner user to further populate the instance of the universal profile ontology data structure). The data custodian functionality implemented by the system and which uses the completion state may include generating conversational user interfaces which are displayed at the data owner user device and used by the data owner user to provide input data to the system for initial or further (i.e. updating) population of the universal profile. The data custodian functionality implemented by the system and which uses the completion state may include generating one or more visual representations of the corpus of business and personal forms/data ontology, its schema and structure, or its completion state, which may be displayed to the user in a graphical user interface. The data custodian functionality implemented by the system and which uses the completion state may include determining or managing a "next most needed" frontier in the population of the completion state of the data ontology instance. The data custodian functionality implemented by the system may include executing form requesting party workflows and formless requesting party workflows.

The form processing systems and methods of the present disclosure may have various applications and provide various advantages. The system may enable relying parties to access data owner user information simply, securely, and in an "evergreen" format using the universal profile. "Evergreen format" may have different meanings based on whether the form is a point in time form or formless exchange. For point in time forms, evergreen can mean notification of updates, or access to updated documentation or data such as passport data (or other expirable or updated data). For formless exchange, there may not be a notification per se, but rather the updated fields show if a requesting party looks in. For example, a company can join the system as a requesting party user and invite their senior officers and directors to join the system as data owner users. The officers and directors can populate an initial universal profile through manual data entry or scraping existing completed forms. As requesting party forms or information requests multiply (e.g. often regulated companies have executives or directors operating in multiple jurisdictions), the system may use machine learning or artificial intelligence techniques to automatically update the universal profile as additional information is required.

Once the regulated company (requesting party) and the officers and directors (data owner users) are users in the system, the form (or formless) completion/verification process is performed automatically by the system. The regulated company (requesting party) can initiate a form completion/content request or an information/form content verification request via the system. Once the investor has received the request and, provided the requesting party user has the appropriate permissions, the system automatically completes the required form (or verifies and documents required information in a formless embodiment). The system may request and collect permission to attach any needed authentication documents residing in the system and may submit the completed form (or verification confirmation) through DocuSign (or similar service) for execution through an API or the like. In an embodiment, the system may include or be configured to provide access to a digital signing tool. The digital signing tool may include an embedded signature capability. The digital signing tool may be accessible through an API or the like. In an embodiment, the digital signing tool may be an embedded signature capability provided by DocuSign via an API.

The system may be configured to automatically prompt data owner users to add additional missing information to their universal profile or if the form or information required (formless) is missing.

The officers and directors and the regulated company may be able to store, catalogue, and search all forms or verification requests including a corresponding status (request/incomplete/completed) using the system. In some cases, the system may be configured to certify accuracy of the information in the universal profile. The system may maintain a record of forms sent and corresponding status for the requesting party. The system may include export capabilities for key data fields for upload into external systems. In some cases, the system may be configured to perform verification of key components of the universal profile including passport, authorized persons for entities (officers, directors), bank account details, etc. The system may generate notifications of information updates (for instance, changes in address or bank account details). In some embodiments, the system may be configured to perform AML checks, credit rating checks, or automatic upload of key data to requesting party systems (e.g. accounting systems, CRM systems). The system may maintain an auditable log of activity for compliance purposes for requesting party users. The log can be used to prove out compliance by the requesting party. The system may maintain a log of 'access granted' for data elements. In some cases, requesting parties may disclose in plain language how data owner data will be used.

Referring now to FIG. 1, shown therein is a system 10 for processing digital forms, according to an embodiment. The digital forms may be business or personal data structured forms.

The system 10 includes a server platform 12 which communicates with a plurality of data owner user (or "form content provider user") devices 14, a plurality of requesting party user (or "form template and form content consumer user") devices 16, a plurality of form template provider devices 18, and a plurality of form template producer user devices 24 via a network 20. The server platform 12 also communicates with a plurality of data custodian devices 22.

The users of the system 10 include data owner users which interact with the system 10 via the data owner user device 14 and requesting party users which interact with the system 10 via the requesting party user device 16. Data owner users may also be referred to herein as data owners or form content providers. A data owner may be any individual, person, group, organization, corporation, etc. that may provide information via a form. A requesting party may be any individual, person, group, organization, corporation, etc. that collects information via a form. Examples of requesting parties include employers, financial institutions, insurance companies, investment firms, service providers, lenders, etc. The system 10 may include other users such as form template provider users, form template producer users, and data custodians, which interact with the system 10 via the form template provider user device 18, the form template producer device 24, and the data custodian device 22, respectively.

The system 10 provides for the collection (or verification) of information from a data owner for the purposes of responding to a form. "Responding to a form" in this context refers to the provision of access to the data that is required or collected by a given form. Generally, in the form context, the data owner is the respondent, or who the form is seeking information from (e.g. individual, corporation). The form also includes a "subject" (or potentially multiple subjects) or "entity". The entity is who or what that sought information is about. In other words, the respondent (data owner) is providing information about the entity to the form. The entity may be a person, an organization, or a corporation. In the simplest of cases, the entity may be the same as the respondent (i.e. the data owner), such as in scenarios where the subject of the form is the data owner itself. In other cases, the entity may be a person, organization, or corporation other than the data owner. An example of such a scenario may be where a parent (data owner) fills outs a form on behalf of a minor dependent (entity). In some cases, the entity or subject of the form may be an object or asset (e.g. a building, a well site, a trust such as a family trust), or even an operation. An example of such a scenario may be where a company (data owner) is responsible for filling out forms regarding regulatory compliance (e.g. environmental effects, such as $CO_2$) of a well site operated by the company. In such a case, the company may be considered the data owner (who provides information to the form) and the well site is the entity (what the information collected by the form is about).

The distinction between a form respondent or data owner (i.e. who provides the information to the form) and a form subject or entity (i.e. who or what the form is about) may be particularly relevant in the context of the system 10. This is because a data owner can use the system 10 to populate one or more universal data profiles, where each universal data profile is about a particular entity. In this way, the data owner may hold various forms of data about various form subjects or entities in one place (i.e. in the system 10, linked to the data owner account), and the data owner can provide access to such data for the purposes of providing form content data about any one of the entities represented by a universal profile. Accordingly, it is to be understood that while the present disclosure may refer to examples or describe the systems and methods in the context of the data owner and the entity (who or what the universal data profile is about) being the same, other variations such as described above are expressly contemplated. In particular, the universal data profile may include information about an entity other than the data owner itself. Generally, the universal data profile can include information about any entity that may be the subject of a form to which the data owner is a respondent.

The server platform 12 may be a purpose-built machine designed specifically for provisioning form content data to a form content consumer or requesting party user using a universal profile stored by the server platform 12. The server platform 12 may be a cloud-native platform. The server platform 12 generates, populates, stores, and maintains a universal profile of data owner data (e.g. professional information, personal information) for a given data owner user. The server platform 12 facilitates access to the universal profile by form content consumers (requesting party users) for the purposes of obtaining form content data from the data owner user. Generally, the form content data corresponds to a subset of the data stored in the universal profile that is needed by the content consumer user to "complete" or "fill out" a form. In some cases, the server platform 12 "completes" the form by generating a completed form which includes a form template and corresponding form content data (i.e. data inputted to a form field). In other cases, the server platform 12 may "complete" the form without generating such a completed form ("formless"), such as by provisioning the form content data without the form template (e.g. in a format suitable for consumption by a content consumer information system) or by verifying the form content data and providing confirmation of verification to the content consumer. The form content data is the subset of data in the universal profile that is needed to complete a given form and for which access thereto is requested by a form content consumer.

The server platform 12, data owner devices 14, content consumer devices 16, form template provider devices 18, form template producer devices 22, and data custodian devices 24 may be a server computer, desktop computer, notebook computer, tablet, PDA, smartphone, or another computing device. The devices 12, 14, 16, 18, 22, 24 may include a connection with the network 20 such as a wired or wireless connection to the Internet. In some cases, the network 20 may include other types of computer or telecommunication networks. The devices 12, 14, 16, 18, 22, 24 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 20. Input device may include any device for entering information into device 12, 14, 16, 18, 22, 24. For example, input device may be a keyboard, keypad, cursor-control device, touchscreen, camera, biometric readers or sensors, or microphone. Data inputted and collected via biometric readers or sensors may be stored by the system 10 as biometric authentication data, for example as a data element of a universal profile, and used for authenticating the source of form content data (i.e. data owner) provided to a requesting party for the purposes of fulfilling a form content request. For example, the biometric authentication data may be provided with the form content data. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22, 24 may include multiple of any one or more of processors, applications, software modules, second storage devices, network connections, input devices, output devices, and display devices.

Although devices 12, 14, 16, 18, 22, 24 are described with various components, one skilled in the art will appreciate that the devices 12, 14, 16, 18, 22, 24 may in some cases contain fewer, additional or different components. In addition, although aspects of an implementation of the devices 12, 14, 16, 18, 22, 24 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22, 24 and/or processor to perform a particular method.

In the description that follows, devices such as server platform 12, data owner devices 14, content consumer devices 16, form template provider devices 18, data custodian devices 22, and form template producer devices are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22, 24 may send information to the server platform 12. For example, a data owner user using the data owner device 14 may manipulate one or more input devices (e.g. a mouse and a keyboard) to interact with a user interface displayed on a display of the data owner device 14. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive a plurality of information, from each of the plurality of data owner devices 14, content consumer devices 16, form template provider devices 18, data custodian devices 22, and form template producer devices 24. Generally, the information may comprise at least an identifier identifying the data owner user, content consumer user, form template provider user, data custodian, or form template producer user. For example, the information may comprise one or more of a username, e-mail address, password, or social media handle.

In response to receiving information, the server platform 12 may store the information in storage database. The storage may correspond with secondary storage of the device 12, 14, 16, 18, 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

The data owner device 14 may be associated with a data owner user account. Similarly, the content consumer device 16 may be associated with a content consumer user account, the form template provider device 18 may be associated with a form template provider user account, the data custodian device 22 may be associated with a data custodian account, and the form template producer device 24 may be associated with a form template producer user account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

Figure 2:
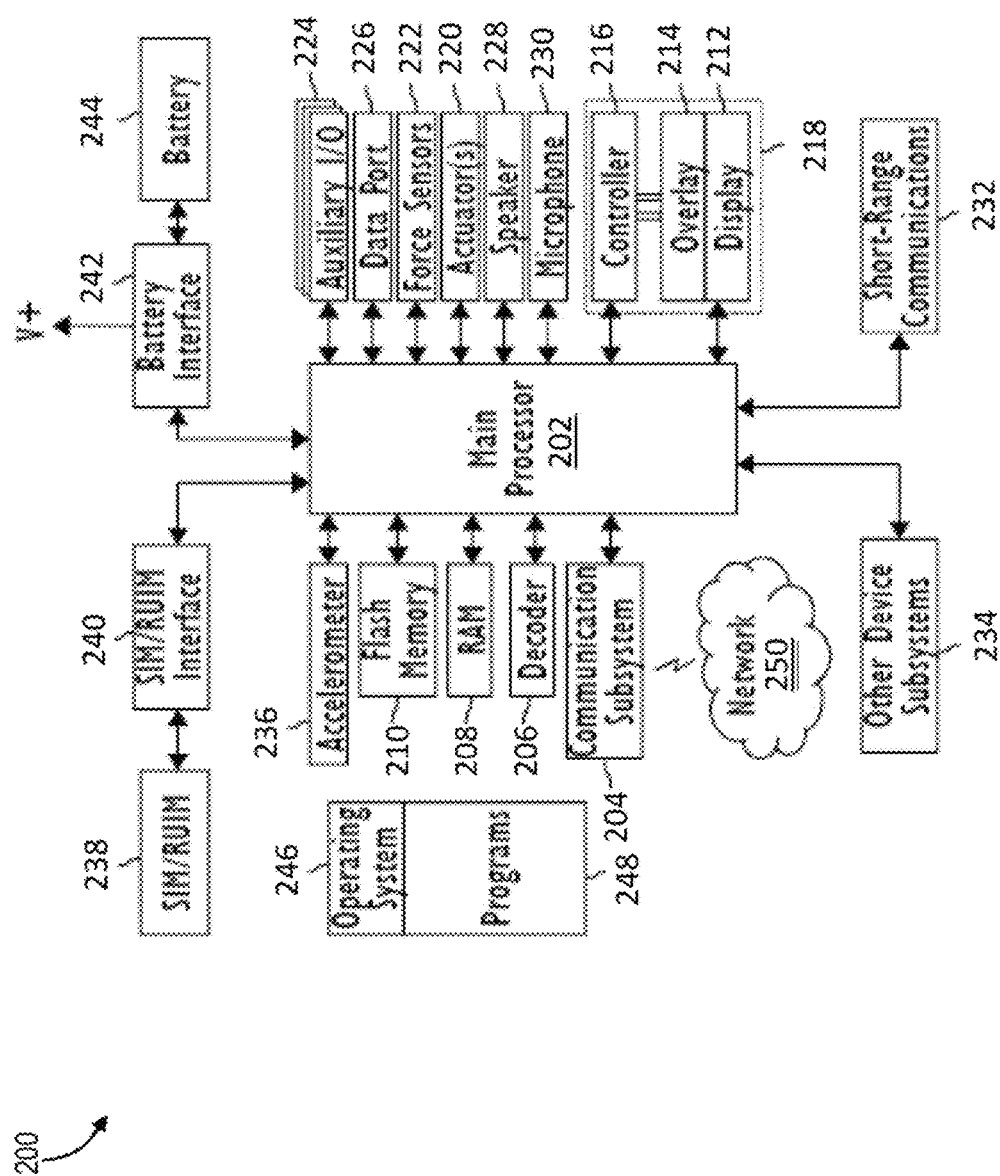
FIG. 2 is a block diagram of a computing device of FIG. 1, according to an embodiment.

Referring now to FIG. 2, shown therein is a block diagram of a computing device 200 of the system 10 of FIG. 1, according to an embodiment. The computing device 200 may be, for example, any one of devices 12,14, 16, 18, 22, 24 of FIG. 1.

The computing device 200 includes multiple components such as a processor 202 that controls the operations of the computing device 200. Communication functions, including data communications, voice communications, or both may be performed through a communication subsystem 204. Data received by the computing device 200 may be decompressed and decrypted by a decoder 206. The communication subsystem 204 may receive messages from and send messages to a wireless network 250.

The wireless network 250 may be any type of wireless network, including, but not limited to, data-centric wireless networks, voice-centric wireless networks, and dual-mode networks that support both voice and data communications.

The computing device 200 may be a battery-powered device and as shown includes a battery interface 242 for receiving one or more rechargeable batteries 244.

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a computing device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the computing device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The computing device 200 also includes an operating system 246 and software components 248 that are executed by the processor 202 and which may be stored in a persistent data storage device such as the flash memory 210. Additional applications may be loaded onto the computing device 200 through the wireless network 250, the auxiliary I/O subsystem 224, the data port 226, the short-range communications subsystem 232, or any other suitable device subsystem 234.

In use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the computing device 200 may be similar. The speaker 228 may output audible information converted from electrical signals, and the microphone 230 may convert audible information into electrical signals for processing.

Figure 3:
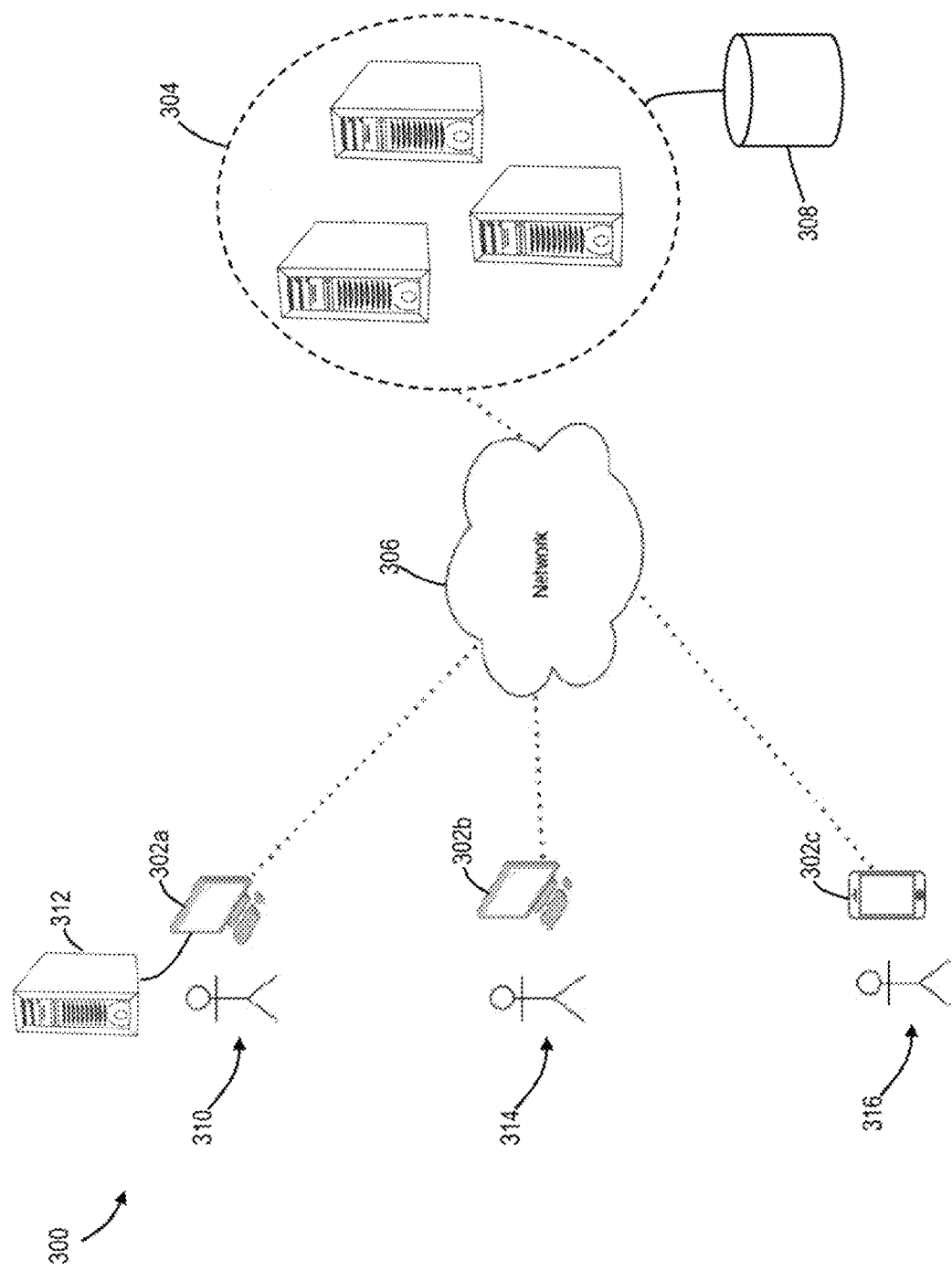
FIG. 3 is a schematic diagram of a system for processing business and personal data structured forms, according to an embodiment.

Referring now to FIG. 3, shown therein is a system 300 for processing digital forms, according to an embodiment. The digital forms may be business or personal data structured forms.

The system 300 includes a plurality of user devices 302a, 302b, 302c connected to one or more servers 304 via a network 306. The servers 304 are configured to store data in databases 308, which are implemented at or otherwise accessible to the servers 304.

User devices 302a, 302b, 302c may be referred to generically as user device 302 and collectively as user devices 302. The user device 302 is a web-enabled device. The user devices 302 are configured to receive data from the servers 304, display data in graphical form, and transmit data to the servers 304. The user device 302 executes an application that can interact with server-side software components ("services") hosted by the servers 304.

The servers 304 include a platform capable of processing, transmitting, receiving, and storing data.

The user device 302a is associated with a requesting party (or consumer) user 310. The user device 302a may be communicatively connected to an information management system ("IMS") 312. The information management system 312 may include computing devices and/or databases used by the consumer 310 to store and process form content data. In some cases, the information management system 312 may be running on the user device 302a, such that the server 304 communicates with the information management system 312 directly. For example, the IMS 312 may be configured to extract form content data from a completed form and process and store the extracted form content data.

The user device 302b is associated with a data owner user 314.

The user device 302c is associated with a form template provider or form template producer user 316.

The system 300 includes a network-based software application. The network-based application executes partially at the server 304 (via server-side software components) and partially at the user device 302 (via client-side software components). In an embodiment, the client-side software components include a user interface (e.g. web-based user interface). The network-based application may be a cloud-based application with server-side software components running in the cloud. In such cases, the servers 304 are configured to implement the cloud-based functionality or are otherwise in communication with cloud servers configured to implement a cloud-based functionality.

In an embodiment, the user device 302 connects to the server 304 via a web browser running on the user device 302.

The server 304 stores data on data owner users 314 (or data under the control or ownership of data owner users and about an entity, which may be the data owner user itself). The server 304 may store the data owner data in the cloud. The data owner data may include professional information, personal information, business information, etc. about the data owner or other entity. The data owner may be an individual or a business/company/organization. Generally, the data owner data stored at the server 304 can be any data about the data owner user (or other entity) which may be collected by a form and the type of data owner data (and type of form) is not particularly limited.

The data owner data is stored by the server 304 as a universal profile. The universal profile data is not stored on the user device 302b. The universal profile may be based on a universal profile ontology data structure stored at the server 304. The universal profile data structure at any moment in time may function as a canonical source of truth on how to structure information. Access to the universal profile is based on individual consent provided by the data owner user 314 to whom the universal profile is linked through interaction with a user interface at the user device 302b. Access to the universal profile by consumer users 310 are stored by the server 304 as permissions. The universal profile access permissions are referenced by the server 304 when fulfilling form content requests (e.g. to complete forms or to verify form content data).

The universal profile provides and acts as a single source of truth ("SSOT") for a data owner's 314 data in the system 300. This means that, in SSOT implementations, essentially no copies of the data are made by the system 300 with respect to a data owner's 314 data. In an SSOT universal profile implementation of the system 300, there is a single location for a data owner's 314 universal profile data in the system 300, with links or mappings to that source data. Access to that source data location is granted or revoked by the data owner 314. Access to the data owner's 314 universal profile data is by reference, not by copy in this distributed system. As such, the data owner's 314 universal profile is the single or only source or authoritative source for the data owner's 314 identity (or other universal profile data) in the system 300. The system 300 may accomplish this through use of an underlying distributed database system. The underlying distributed database system is able to proxy requests and access to the original source data provider.

The SSOT feature of the universal profile may provide an ever-updating data profile that automatically notifies a requesting party of relevant updates by data owners. For example, the server 304 may monitor changes to the universal profile of a data owner and when a change is made (e.g. banking details, address, etc.), the server 304 may generate a notification to any requesting party with access to the changed user profile. The server 304 may identify relevant requesting parties through the form field to universal profile data structure mapping.

The data owner 314 uses the user device 302b to upload information to the server 304 for storage in their universal profile. The data owner 314 interacts with a user interface executing at the user device 302b to provide the information for upload. The user interface may be configured to receive such information through manual data entry into the user interface or by upload of a completed form (which the server 304 can process to acquire the information to populate the user profile).

The form template provider or form template producer 316 uses the user device 302c to upload a form template to the server 304. The form template corresponds to a digital representation of an unfilled or uncompleted form (i.e. without form content data). The form template is designed to receive form content data from a data owner as input to one or more form fields in the form.

The consumer user 310 uses the user device 302a to transmit a form content (or completion) request to the server 304. The form content request may specify a form template and a data owner (i.e. a user to provide the information required by the form). In some cases, the form content request may coincide with the consumer user 310 using the user device 302a to submit a form template to the server 304 (a "form submission"). In such a case, the consumer user 310 is acting as a form template provider 316. In other cases, the form template specified in the request may already exist in the system 300 and be stored at the server 304. The form content request requests consumer user access to the universal profile of a specified data owner user in order to obtain the required form content data.

The server 304 receives the form content request and determines the specified form template and specified data owner user 314. The server 304 may determine whether the specified data owner user has previously provided permission to the requesting consumer user 310 for the specified form template and whether any such permission is active/not expired. The server 304 may transmit the form content request to the user device 302b of the specified content user 314 for review. The form content request (or details thereof such as the requesting party, form identifier, type of information requested) may be displayed in a user interface executing at the user device 302b. The data owner 314 uses the user device 302a to accept the form content request and permits access to the universal profile under the terms of the request. The user device 302b transmits request acceptance to the server 304.

Upon determining that the data owner user has permitted access to the universal profile to fulfill the form content request (whether through receiving new request acceptance or determining permission to access is pre-existing), the server 304 fulfils the form content request by provisioning access to the universal profile. In doing so, the server 304 may bind the form representation to the universal profile.

The server 304 may fulfil the form content request by generating a completed form including a form template filled with corresponding form content data drawn from the universal profile. The completed form may be stored at the server 304 in a manner accessible to the consumer user 310. Access may be temporary or ongoing (e.g. until permission is revoked). The completed form may be transmitted to the user device 302a and displayed in a user interface.

The server 304 may fulfil the form content request by provisioning the form content data drawn or obtained from the universal profile to the user device 302a without generating a completed form. The form content data may be transmitted from the user device 302a to the consumer IMS 312 or may be sent directly from the server 304 to the IMS 312.

The server 304 may fulfil the form content request by verifying the form content data obtained from the universal profile. The server 304 may perform the verification process itself or may use a verification system in communication with the server 304 (e.g. through an API). Upon successful verification, the server 304 may generate a verification confirmation and store the confirmation at the server 304 in a manner accessible to the consumer user 310.

The server 304 may autofill forms using form content once permission to access the form content data from the universal profile is granted. The system 300 may implement smart form capability. This may be particularly useful for longer forms. The smart form capability may be configured to analyze form content data responding to the form template and determine whether certain form fields are needed. Those form fields that are not needed or relevant based on form content data responding to another form field in the form template may be ignored, removed, hidden, etc. In an example, for a private entity, once an investor type is identified by the smart form capability (e.g. by form content data specifying a certain type of investor in response to an investor type form field in a form template), form fields relating or relevant to non-specified investor types are ignored (e.g. tagged as not relevant, hidden, removed, etc.). The system 300 may determine (and potentially tag) relevant and non-relevant form fields based on the form content data provided by the data owner. The system 300 may hide, remove, or obscure the form fields determined to be non-relevant.

The server 304 may be configured to maintain an auditable log of activity for requesting parties. The auditable log may be used to prove that requesting parties have satisfied compliance requirements. The auditable log may be stored in the database 308. The server 304 may be configured to maintain a log of 'access granted' for data elements (in universal profiles). The log may be stored in the database 308.

The system 300 includes a form mapping subsystem. The form mapping subsystem maps form data to a defined schema architecture and specification (universal profile data structure, ontology framework).

The form mapping subsystem may be configured to automatically segment arbitrary forms (e.g. image, PDF, document files) into form fields that are mapped to the universal profile data structure having a defined schema architecture and specification (e.g. UP ontology).

The system 300 includes data custodian subsystem. The data custodian subsystem may hold data structured forms. The data custodian subsystem holds data produced by the ontology system (i.e. the universal profile) as a custodian on behalf of a data owner user. The data custodian subsystem may use active consent provided by the data owner user (universal profile owner) and authorized governance rights to populate structured form data as requested by relying parties running a form mapping agent that are authorized by the data owner user to access the universal profile. The data custodian subsystem may be configured to gather information (universal profile population input data) from a data owner user to hold in trust as a universal profile. The data custodian subsystem may be configured to control and provide access to the universal profile data to relying parties under controlled contexts in accordance with specific data governance policies stored in at the server 304.

The system 300 includes a user interface subsystem. The user interface subsystem is configured to populate the data ontology with universal profile population input data to generate a populated universal profile. The user interface subsystem may use an incremental workflow to populate the universal profile. The workflow implemented by the user interface subsystem may be a workflow enabling a data owner user to engage in a given form that has been mapped to the universal profile data ontology by a form mapping agent. The user interface subsystem may implement an incremented process for the data owner user to populate the data ontology.

The system 300 may use machine learning to introduce predictive ability. Such predictive ability may be used with the requesting party in situations where a form is uploaded and the server 304 uses machine learning to map field names to the existing ontology. Such predictive ability may be used with the data owner in situations where the system 300 is used to complete a form for which the requesting party is not a user in the system 300 and therefore the fields in the form are to be mapped to the universal profile ontology. Further, the system 300 may use machine learning to predict responses based on what information is already present in the universal profile.

In some cases, the system 300 may be used to verify data such as government issued ID, attesting to professional credentials, education, employment, etc. Such data to be verified is stored in the universal profile.

As described, the system 300 may include client-side software components (or front-end software components) executing for example at user devices 302 and server-side software components (or back-end software components) for example executing at server 304.

In some embodiments, the front-end software components may use one or more software tools to provide or enhance functionality.

In an example, the front-end software components may be implemented using a JavaScript framework such as ReactJS. The JavaScript framework may be configured to create single-page websites that are dynamic and responsive. In variations, other suitable tools providing similar functionality to ReactJS may be used.

In another example, the front-end software components may be implemented using a programming language such as the Typescript programming language or the like. Typescript advantageously allows for optional static typing which is not natively implemented in JavaScript.

In another example, the front-end software components may be implemented using a scripting language such as Sassy CSS or the like. Sassy CSS comprises a scripting language that allows for dynamic generation of CSS stylesheets, enabling for dynamic and flexible application of CSS. Sassy CSS scripts may compile to CSS.

In another example, the front-end software components may be implemented using a UI build and test tool, such as Storybook or the like. Storybook comprises a software tool configured to isolate UI components from core application functionality, such that each UI component may be tested during development, in the absence of other interacting components. Such functionality allows a developer to build UI components before the completion of other dependent components.

In another example, the front-end software components may be implemented using a browser automation or compatibility testing tool, such as Selenium or the like. Selenium allows users to create scripts that will execute on a variety of browsers to test their compatibility and functionality.

In some embodiments, the back-end software components may use one or more software tools to provide or enhance functionality.

In an example, the back-end software components may be implemented using a server-side JavaScript that processes events and performs work outside of the browser. In an embodiment, the server-side JavaScript may be NodeJS. The server-side JavaScript runtime environment may help scale web applications (e.g. past 10,000) without losing concurrency.

In another example, Typescript may be used instead of JavaScript to implement back-end or server-side software components.

In another example, the back-end software components may be implemented using a mobile and web application development platform such as Google Firebase or the like. Associated tools, such as Firebase Authentication may be used to implement backend user identity and authentication services within the Firebase based application.

In another example, the back-end software components may be implemented using a cloud database platform, such as Cloud Firestore or the like. Cloud Firestore is a NoSQL document database that lets users easily store, sync, and query data for your mobile and web apps at large scale.

The system 300 may also include or make use of one or more software tools.

In an example, the system 300 may utilize a source code repository hosting service such as Bitbucket™ or the like. The source code repository hosting service may provide a central location to manage git or other repositories, collaborate on source code, and provide guidance through development flow. The source code repository hosting service may also help control versioning and deployments.

In another example, the system 300 may utilize a continuous integration and delivery tool such as BitBucket pipelines or the like. BitBucket pipelines allows users to automatically build, test, and deploy code based on a configuration.

In another example, the system 300 may utilize error tracking software such as Rollbar or the like. Rollbar is an error tracking tool that integrates with Slack and other software to help monitor and address software errors as soon as possible. Errors may be grouped to reduce noise and improve readability. Rollbar supports Type 1 and Type 2 SOC.

In another example, the system 300 may utilize an end-to-end encryption framework or platform such as E3Kit or the like. E3Kit is an end-to end-encryption framework that supports public/private key encryption schemes, Google Firebase, Node.js, one to one encryption, and group encryption.

In another example, the system 300 may utilize a document or PDF processing API, framework and/or platform such as PSPDFkit. PSPDFkit enables collaboration, signing, and markup of documents in both web and mobile applications. PSPDFkit can manipulate PDF files on either platform.

In another example, the system 300 may utilize an electronic signature and document management platform, such as DocuSign. DocuSign provides APIs that enable digital signature capabilities, with a proven and trusted authority.

Figure 4:
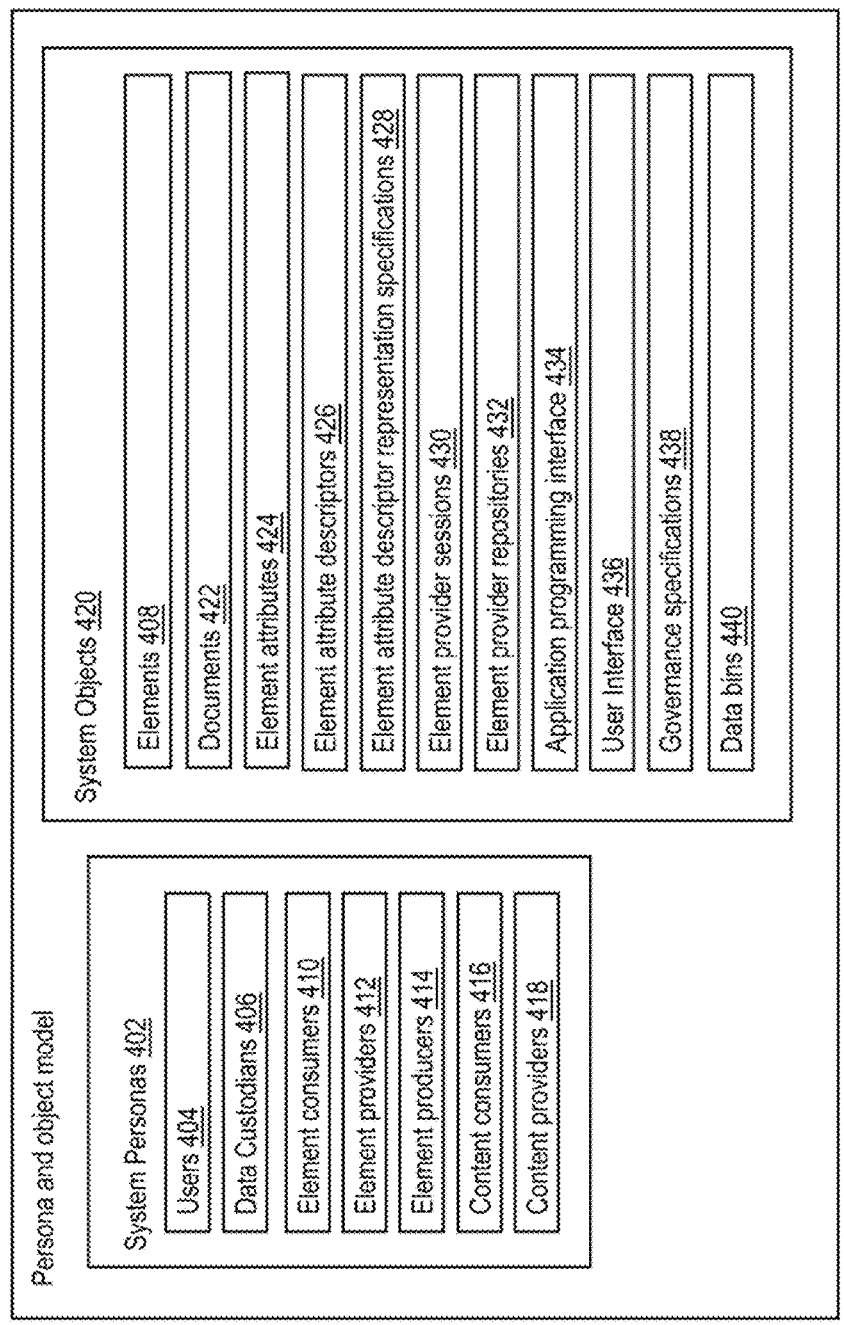
FIG. 4 is a block diagram illustrating a data model implemented by the system of FIG. 3 including system personas and objects, according to an embodiment.

Referring now to FIG. 4, shown therein is graphical representation 400 of a persona and object model implemented by the system 300, according to an embodiment.

The persona and object model 400 includes system personas 402. A persona 402 represents different user roles of the system 300.

The system personas 402 include users 404. A user 404 is a user of the system 300.

The system personas 402 includes data custodians 406. A custodian 406 is a custodian of documents (or forms) in the system 300. The custodian 406 is not a power of attorney, but rather a digital custodian. The custodian 406 enforces rules and governance specifications. The rules and governance specifications may relate to an ontology promotion process (e.g. promoting a local ontology specification to be a system-wide ontology specification held in the system-wide ontology) or to requesting party access to a data owner user's universal profile. Permission of the requesting party 310 to access a data owner's 314 universal profile is specified by the data owner 314. The permission may be an ongoing permission or a point-in-time permission. The custodian 406 may enforce permissions specified by the data owner.

In some cases, the requesting party may be provided with access to data that expires (i.e. expirable data). For example, the requesting party may be provided with access to passport data (e.g. data collected from a digital copy of a passport).

If such permissioned access to the requesting party is ongoing, whether indefinite or for a defined period of time, there is the potential for expirable data provided to the system by the data owner at one time (e.g. at an initial stage, such as onboarding/creation of account) to expire prior to the requesting party accessing the data (whether it is first access or subsequent access). Such case presents opportunity for invalid or incorrect data to be accessed by the requesting party when completing a form.

Accordingly, in some embodiments, the system may be configured to implement an evergreen compliance functionality for providing ongoing access to expirable data. In such embodiments, the requesting party may be granted permission to access to a most recent version of expirable data (e.g. data from a current copy of a passport) on an ongoing basis.

The system personas 402 include element consumers 410. An element consumer 410 is an entity that wants to consume information from the form. An element consumer 410 may also be referred to as a "requesting party".

The system personas 402 includes element providers 412. An element provider 412 is an entity that presides over a form in the system 300. The element provider 412 may or may not be the entity that produced the form (i.e. the element producer 414, below).

The system personas 402 include element producers 414. An element producer 414 is an entity that produces a form.

The system personas 402 include content consumers 416. A content consumer 416 is a consumer of actual content for the forms or documents (i.e. form content data).

The system personas 402 include content providers 418 (data owners). A content provider 418 is a provider of actual content for the form or document (i.e. provides the form content data).

The persona and object model 400 includes system objects 420. The system objects 420 are stored and manipulated by the system 300 (e.g. by the server 304).

The system objects 420 include form elements 408 (or "elements"). A form element 408 is a form in the system 300. The form element 408 may contains structured and unstructured data. The form element 408 may be considered a form representation stored by the system 300 (i.e. a representation of the form in the system, such as a form mapping).

The system objects 420 include documents 422. A document 422 is a document or form in the system 300. A document 422 may be a form representation of a form that is stored by the server 304. A form element 408 is a document 422, but a document 422 is not necessarily a form element 408.

The system objects 420 include element attributes 424. An element attribute 424 is a field in the form or document 422. A document 422 may include a plurality of element attributes 424 corresponding to form fields contained in the document 422.

The system objects 420 include element attribute descriptors 426. An element attribute descriptor 426 is a content descriptor for an element attribute 424 (i.e. for the field in the form).

The system objects 420 include element attribute descriptor representation specifications 428. An element attribute descriptor representation specification 428 may include a specification of any one or more of format, storage, validation process and other information regarding the field.

The system objects 420 include element provider sessions 430. An element provider session 430 is a login session that facilitates access to an element provider repository (e.g. element provider repository 432, below). The access may be facilitated via a user interface and API.

The system objects 420 include element provider repositories 432. An element provider repository 432 is a set of bins (e.g. bins 440) that may be private or accessible to certain (permissioned) users 404. The system objects 420 may also include content provider repositories (not shown). Content provider repositories may be created by content providers 418 (or data owner 314).

The system objects 420 include an API 434. The API 434 is an API specification (e.g. json, yaml) to access element attributes 424. Access may be via rest or other with java/python etc.

The system objects 420 include a user interface 436. The user interface 436 is a user interface though which a user 404 can interact with the system.

The system objects 420 include governance specifications 438. A governance specification 438 may include access controls and other governance "rules" or policies about the data stored by the system (e.g. universal profile data).

The system objects 420 include data bins 440. A bin 440 is a grouping or set of elements 408. A bin 440 may be a set of data about the content provider user 418. The bin 440 holds parts of the content provider's 418 universal profile. A repository (e.g. content provider repository, element provider repository) contains the forms with references to the data from the bins 440. So, bins 440 have no forms (i.e. it is "my data"). Repositories contain forms and the references to the universal profile data. There may also be bins 440 that contain form templates.

In the system 300, there is a universe of applicable forms (digital or paper in nature) of fields of structured data (e.g. name, address, and title of current employment) and unstructured data (e.g. a 100-word description of role in your current employment).

An element 408 refers to a specific form, such as an accredited investor form, which can be used to meet the requirements for the information set as per the choice of an element consumer 410, who is the entity that is seeking the information from the form. An element provider 412 is the person or organization that produces the form, which may be different from the element consumer 410. It is also possible that an element provider 412 may be the entity that defines a form (such as Canada Revenue Agency) but decides to outsource the management of that form's structure to an external consultant. In that case, the element producer 414 is the organization who produced the form on behalf of the element provider 412 who is the organization who presides over the form itself. In most cases, the element provider 412 and the element producer 414 are the same entity.

As an example, if an employer needs to have a new employee fill out a tax form that came from the government, the government is the element provider 412, the employer is the element consumer 410, and the employee is the content provider 418. Because the employer also is consuming the content from the employee, the employer is also a content consumer 416.

An element attribute 424 refers to a field in a given form. The element attribute 424 has an element attribute descriptor 426 which corresponds to the content descriptor, such as "first name", and an element attribute descriptor representation specification 428 which defines the format of storage, field constraints (like maximum length, phone number format, etc.), and validation processes (such as "verify matching record exists in a database, or require government attestation of validity—such as a CRA confirmation of a Social Insurance Number being of valid format and/or matching the given person). Validation processes can also have state, such as "pending" or "successful". All element attributes 424, element attribute descriptions 426, and element attribute descriptor representation specifications 428 are initially local to the element 408 as defined by the element provider 412 through a user interface 436 and/or programmatic specification 434 (JSON, YAML, and/or via API in a language like Python, Java, etc., or via a REST or other network-based API).

The ontology system then allows local element attributes to be "promoted" into a system-wide ontology. This promotion candidacy and eventual approval, adjustment, or rejection, is controlled by an ontology governance mechanism. The ontology governance mechanism may be at the sole discretion of the system provider or data custodian or may be transferred to a governing organization such as a standards body.

As previously noted, the system 300 may include a form mapping subsystem for ontology mapped personal and business data structured forms. The mapping subsystem may include a mapping agent. The mapping subsystem may be configured to automatically segment arbitrary forms (e.g. images, PDFs, document files, etc.) into fields mapped to the universal profile ontology.

Element provider 412 accounts may log into an element provider session 430 facilitating access to an element provider repository 432. This may be facilitated via a user interface and API. The element provider repository 432 allows for bins that may be populated with an element 408 that is private to the element provider user 412, and/or private to arbitrary groups of element provider users 412 (as set by the system, a group administrator, or the active user account), and/or the public universe of system users 404. Similar access control settings may exist to allow view and populating of forms to individuals, groups, or the public universe of system users 404.

The element repositories 432 may be populated with elements 408 produced by scan, fax, mobile app, mobile camera, printed by a virtual print driver, uploaded (e.g. as PDF, TIFF, JPEG, PNG, GIF, and other such formats), or other suitable technique. Elements 408 enter the system 300 in their original binary format but then have metadata that is used to manage translations into other formats, segmentation of fields, mapping of segments of fields into element attributes 424, mapping of element attributes 424 into element attribute descriptions 426, and mapping of element attribute descriptors 426 into element attribute descriptor representations 428. These translations, segmentation, and mapping processes may have default value provided by predictive mechanisms including machine learning and other such methods. This document processing pipeline may also have visual representation of element 408 status in a repository user interface (including mapping down to the individual element attributes 424, showing relevant metadata for each item).

Elements 408 may be combined to create composite elements using elements 408 accessible to the producing element provider 412.

The element provider repository 432 may also be available to an element provider user 412 via a desktop application that "facilitates a virtual drive", similar API and disk integrations on enterprise information system servers.

A user 404 may also create bins of elements 408 that are active for that user 404. Elements 408 may be selected from the available elements. A user repository may have a similar user facing layout and features, and may allow grouping, mapping of fields, and display of metadata and processing state. The mapping between a user 404 populating an element attribute 424 can leverage the mapping between the user 404 and the element provider 412 to facilitate chat, help, chatbot, comments, and other such interactive communications to provide assistance, feedback, and other forms of collaboration.

Figure 5:
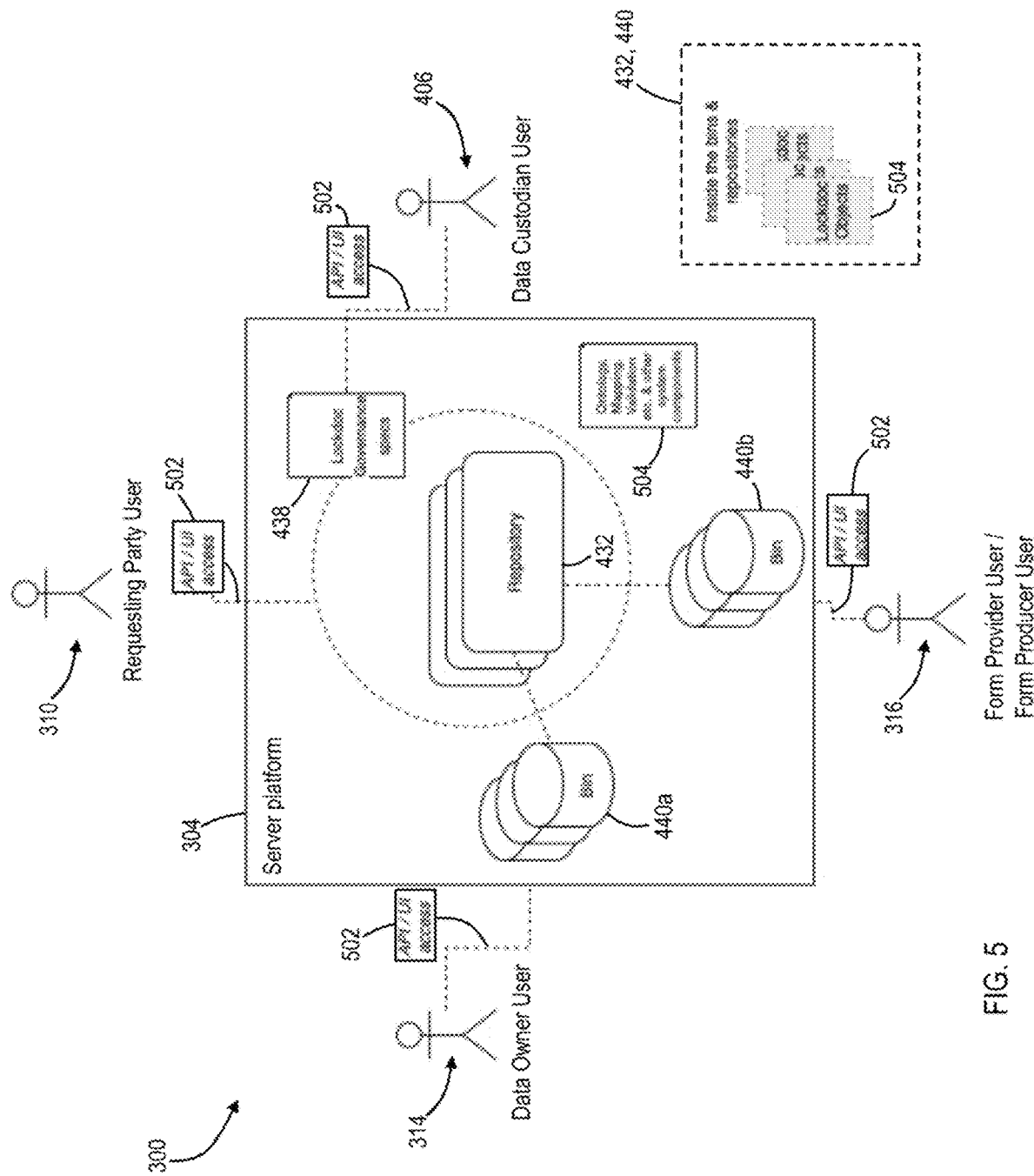
FIG. 5 is a schematic diagram of the system of FIG. 3 is further detail, according to an embodiment.

Referring now to FIG. 5, shown therein is the system 300 of FIG. 3 in further detail, according to an embodiment. The system 300 implements the personas and objects model 400 of FIG. 4.

The system 300 includes a plurality of users 404 including a consumer user 310, a data owner user 314, a form template provider (or form template producer) user 316, and a data custodian user 406. The users 310, 314, 316 use user devices 302 (not shown) to connect to the server platform 304 via API/UI access 502. The data custodian user 406 similarly connects to the server platform 304 via API/UI access 502 from a data custodian computing device (not shown).

The server platform 304 includes repositories 432 and bins 440a, 440b (generically referred to as bin 440 and collectively as bins 440). The repositories 432 may include element provider repositories (i.e. template form representations) and data owner (or content provider) repositories. Generally, the repositories 432 and bins 440 store objects 504, which may include universal profiles and template form representations.

Bins 440a include data owner (or form content provider) bins linked to data owners 314. The data owner bins 440a store universal profile data of the data owners 314. The universal profile data stored in the bin 440a can be drawn on to obtain form content data (form content data being data, derived from the universal profile, that is used to "complete" a given form content request (e.g. fill out a form template) in the system).

Bins 440b include form template provider (element provider) bins linked to form template (element) providers 316. The form template provider bins 440b store form template representations (i.e. uncompleted form templates which are designed to collect form content data from a subject).

The server 304 stores governance specifications 438. The system 300 may be configured such that the data custodian 406 has primarily read level access to ensure overall governance required for purposes of compliance or regulation. Ultimately, only the data owner 314 can control access to their universal profile data.

The governance specifications 438 include access controls and other governance "rules" or policies about the data stored by the system 300. The governance specifications 438 may include legal or corporate policy requirements. The governance specifications 438 may comprise top level settings that cannot be overridden by either the consumer 310 or the provider 316. The governance specifications 438 may specify whether consumer 310 access to a data owner 314 universal profile is a one-time access or an ongoing access (e.g. for a specified time period, until revoked, etc.). The governance specifications 438 may include policies about how data may be used by the system. The governance specifications 438 may include specifications made by the requesting party as to whether a form is view only, printable, or downloadable. For example, the governance specifications 438 may specify that a form is view only by the requesting party 310 with potential export of certain necessary data fields (which may be specified in the specifications 438). For example, the governance specifications 438 may control access by consumer users 310 to the universal profile data of data owner users 314. The governance specifications 438 may be referenced by the server 304 or by the data custodian 406 when fulfilling form content requests (which include accessing a subset of a data owner's universal profile for completing a form, whether by filling out the form or by verifying the form content data drawn from the universal profile). In other words, the governance specifications 438 may control binding of universal profile data to a form template representation.

The server platform 304 also stores and executes various software components 506. The software components 506 include an ontology subsystem, a mapping subsystem, a governance, compliance, and consent subsystem, and a validation subsystem.

The ontology subsystem stores and maintains a universal profile ontology data structure. The ontology subsystem is configured to populate an instance of the universal profile ontology data structure to generate a universal profile for a data owner user 314. To facilitate universal profile population by the ontology subsystem, the data owner user 314 enters information into the user device 302, which is transmitted to the via the UI 436 or API 434. The information may be provided via manual data entry (e.g. in the user interface 436 executing at the user device 302) or by document upload (e.g. a completed form). The ontology subsystem populates the universal profile using the received information and stores the universal profile data in a bin 440a linked to the data owner user 314.

The mapping subsystem is configured to map form templates to the universal profile ontology data structure. The form template may be uploaded to the server 304 from a user device 302 by a form template (element) provider user 316. The mapping of the form to the universal profile ontology may be referred to as a form representation, a form template representation, a form mapping, or a mapped form. In particular, the mapping subsystem may cause the server 304 to identify form fields (element attributes) in a form template and map the form field to the universal profile ontology data structure (e.g. via an ontology/element attribute specification).

The mapping subsystem is further configured to bind universal profile data to a form template in response to a form content request from a content consumer user 310 and based on corresponding access permission being granted by the data owner user 314. This binding may be used to generate a completed form (i.e. form template filled with form content data drawn from the universal profile) or to verify form content data drawn from the universal profile (e.g. in a formless application). The mapping subsystem utilizes the mappings of the form fields in the subject form template to the universal profile ontology data structure in performing the binding. The binding performed by the mapping subsystem may be considered a type of "auto population" of the form template with form content data, though, as noted, the auto population may or may not include generating an actual completed form.

The governance, compliance, and consent (GCS) subsystem is configured to manage access to the repositories 432. For example, the GCS subsystem manages requesting party user access to universal profiles of data owner users 314 (e.g. through an active consent provided by the data owner user 314).

The GCS subsystem may also manage compliance requirements on forms. The GCS subsystem may be configured to manage compliance requirements on forms by maintaining access logs on forms. The access logs may record or store data such as when certain form data was accessed, who accessed the form data, when the data for a certain form was deleted, what the lineage of the data is, etc. Generally, the GCS subsystem may be configured to record in the access logs any data suitable for satisfying compliance, audit, or regulatory requirements. For example, such access logs may be maintained by the GCS subsystem and used to ensure that a corporation that holds data about any individual via the system can manage that information and has transparency and visibility into where that information is coming from. The GCS subsystem may also implement other 'rules' for managing compliance requirements on forms. The system may store the rules (e.g. for deletion of data) and the GCS subsystem may reference the rules and automatically perform certain operations in accordance with the rules. In an embodiment, the GCS subsystem may be configured to automatically delete data (i.e. universal profile data of a data owner 314) that would otherwise be available to the requesting party 310 after a specified time period. The specified time period for automatic deletion may be set by the requesting party 310 (e.g. via the user interface 502) or by the system 300 (e.g. by a system administrator). In an embodiment, the GCS subsystem may implement certain privacy law requirements such as informed consent or the right to be forgotten.

The verification subsystem is configured to verify form content data drawn or obtained from a universal profile according to a permissioned form content request. The verification subsystem may verify the form content data directly or may facilitate verification by a third party verification system (e.g. through an API or the like). The verification subsystem generates a confirmation upon successful verification of the form content data. The verification confirmation may be stored at the server 304 in a manner accessible to the consumer user 310 via the user device 302.

The system 300 may also include connectors with other components (e.g. proxy to external information systems). The connectors may include a connector to a Salesforce CRM or the like or to a corporate Active Directory system. As an example, the connectors may be connectors to enterprise systems that may make it easier for a corporate user of the system 300 to easily access contact information to send out forms to data owner users 314. The connectors may include connectors to external information systems for a provider to import identity information from other sources.

Figure 6:
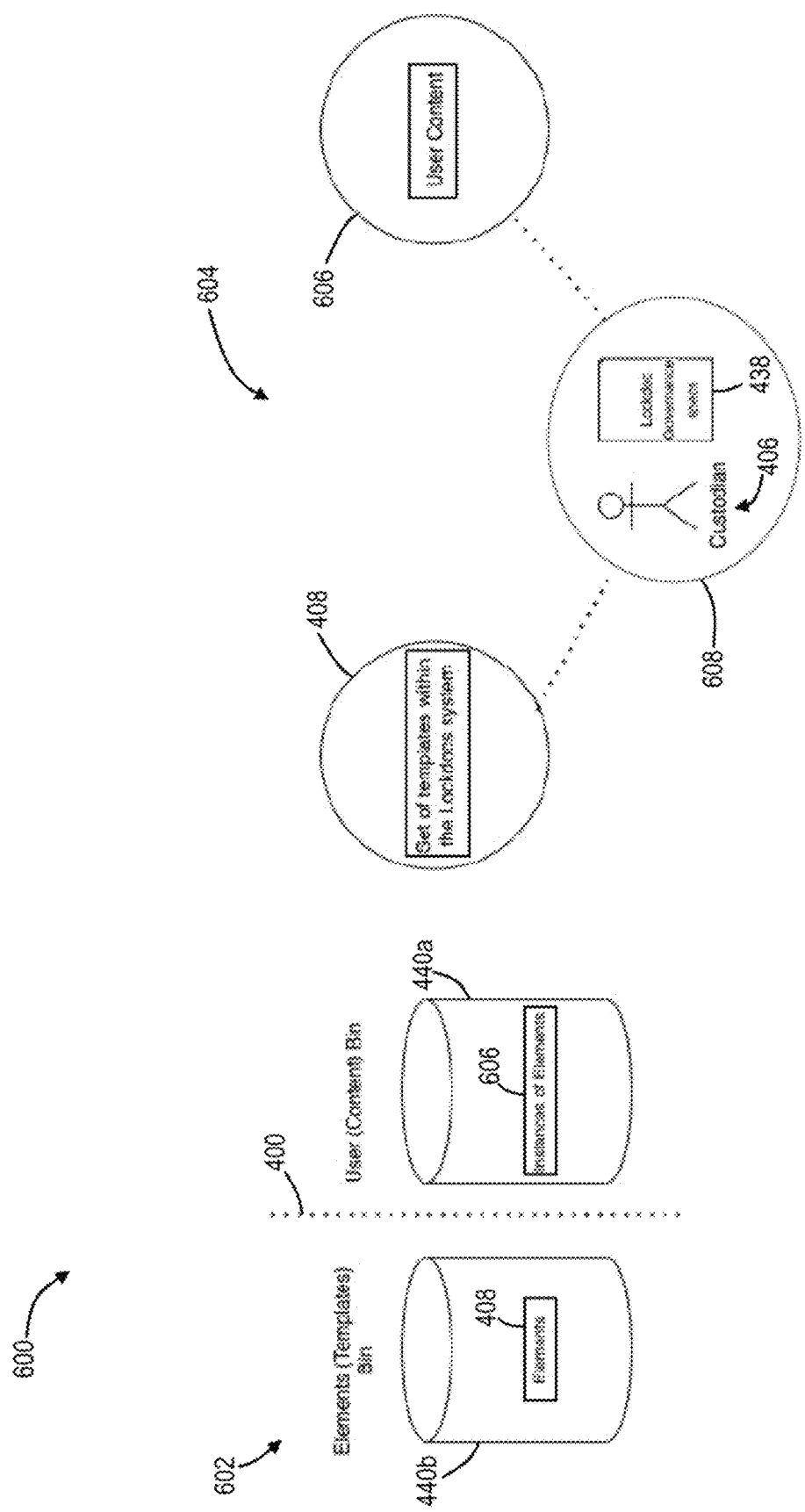
FIG. 6 is a schematic diagram illustrating brokering between form templates and user content by a data custodian implemented by the system of FIG. 5, according to an embodiment.

Referring now to FIG. 6, shown therein is a graphical representation 600 of data storage 602 and a data binding process 604 implemented by the server 304 of FIG. 5, according to an embodiment. The data binding process 604 uses a data custodian (e.g. custodian 406).

The server 304 stores an elements (form templates) bin 440*b*. The elements bin 440*b* contains one or more elements 408. An element 408 may be linked to one or more form template (element) providers 316 or consumers 310 (such that the element is available to them). The elements 408 may comprise form templates mapped to the universal profile ontology data structure.

The server 304 stores a user (content) bin 440*a*. The content bin 440*a* contains instances 606 of elements 408. The instances 606 correspond to universal profile data for a data owner 314. In particular, an instance 606 comprises a subset of the universal profile of a data owner 314 that is used to fulfil a particular form content request from a requesting party 310. For example, the universal profile may comprise a plurality of element instances with each element instance in the universal profile corresponding to an element 408 (i.e. each data item in the universal profile corresponds to at least one form field or element attribute that has been mapped to the universal profile ontology). An element instance 606 may be linked to one or more data owner users 314.

Dotted line 608 separating the elements bin 440*b* and the user content bin 440*a* represents the separate storage of and controlled access to the bins 440*a*, 440*b* (i.e. only permissioned users can access the bins). Brokering by the data custodian 406, as illustrated in binding process 604, is required to bind data from the user content bin 440*a* to data from the elements bin 440*b*.

The binding process 604 is used to bind user content 606 to an element 408 as part of a form completion process. This process 604 may be initiated by the server platform 304 in response to receiving a form content request from a requesting party (content consumer 310). The process 604 uses a broker mechanism 608 including the data custodian 406 and the governance specifications 438 stored at the server 304. The broker mechanism facilitates binding of the user content 606 to the form template (element) 408 according to the governance specifications 438. In doing so, the data custodian 406 permits access to the user content 606 to populate the form template 408 in accordance with the governance specifications 438. The data custodian 406 oversees and facilitates the transaction between form elements 408 mapped to the universal profile ontology data structure and user form content derived from the populated universal profile of a given data owner 314.

Figure 7:
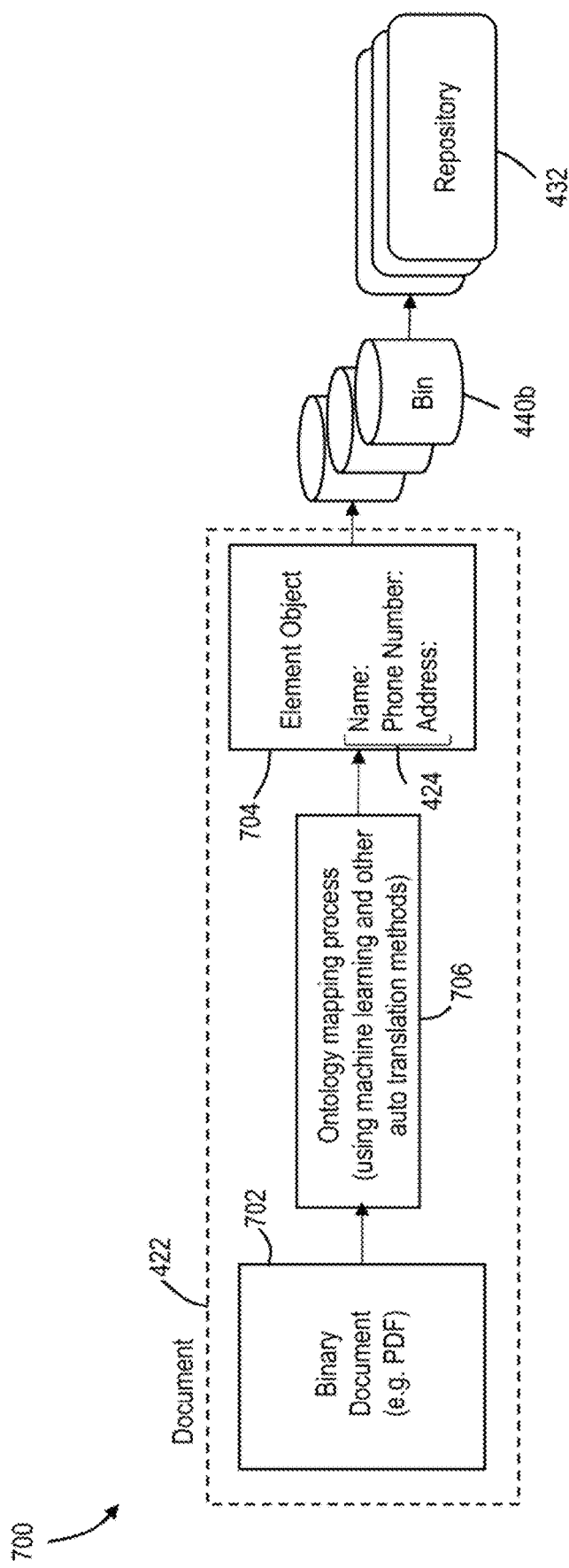
FIG. 7 is a block diagram illustrating an ontology mapping processing pipeline for mapping a form template to a universal profile ontology, according to an embodiment.

Referring now to FIG. 7, shown therein is a document/form mapping processing pipeline 700 for mapping a form template to a universal profile data ontology structure, according to an embodiment. The pipeline 700 may be implemented by the server 304 of FIG. 5 (e.g. via mapping subsystem) or by the form mapping engine 1128 of FIG. 11 (described below).

The pipeline 700 includes a document 422 (or element 408), which is a document or form in the system and may have multiple different representations. The document 422 may include structured and unstructured data. The document 422 may be produced by scan, fax, mobile app, mobile camera, printed by a virtual print driver, or uploaded (e.g. as PDF, TIFF, JPEG, PNG, GIF, and other such formats).

Figure 8:
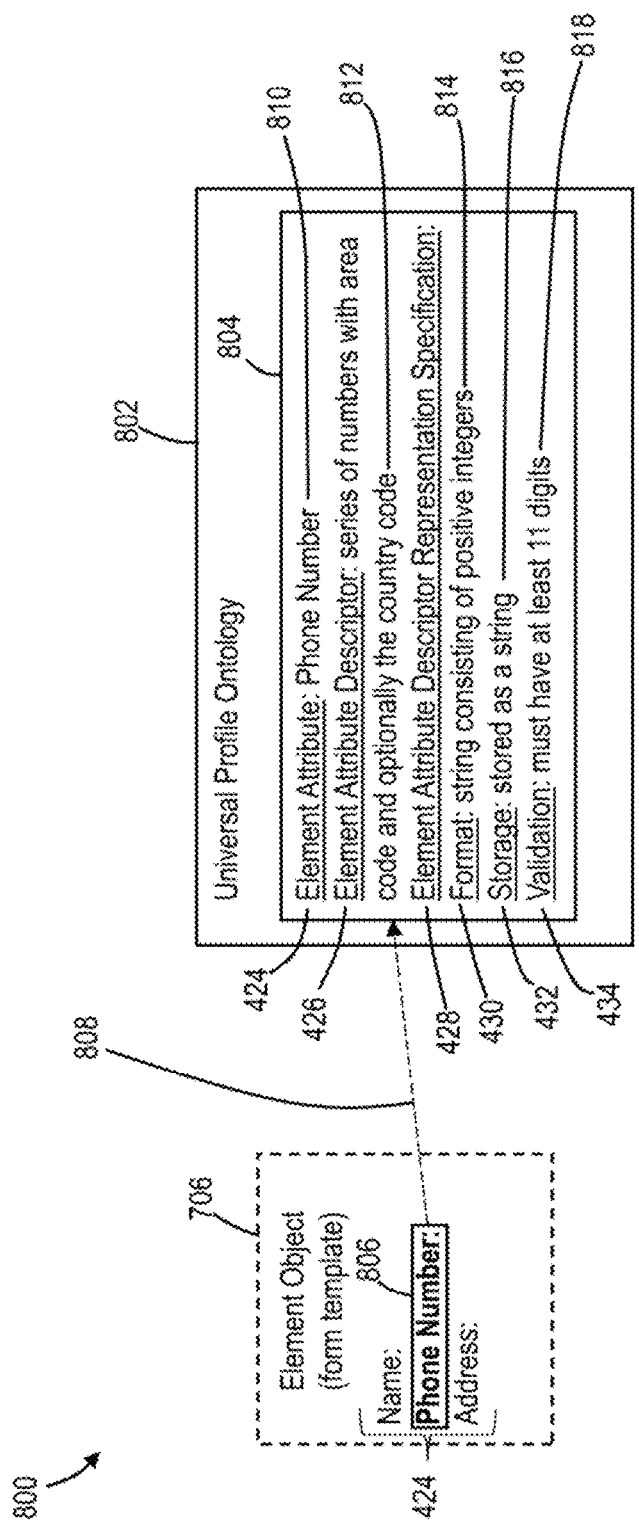
FIG. 8 is a graphical representation of a form element object including a phone number element attribute and a corresponding ontology specification for the phone number element attribute generated by the system of FIG. 5, according to an embodiment.

The document 422 enters the pipeline 700 in its original binary format as a binary document 702. The binary document 702 is provided to an ontology mapping module 704 which converts the binary document 702 into an element object 706. The element object 706 corresponds to a form template that is mapped to a universal profile ontology data structure. The element object 706 includes a plurality of element attributes 424. An element attribute 424 corresponds to/is a representation of a form field in the form 422. For example, element object 706 includes element attributes 424 of name, phone number, and address. These element attributes 424 correspond to a name field, a phone number field, and an address field in the form 422. Element attributes 424 can be mapped to corresponding element attribute ontology specifications in the universal profile ontology data structure, as illustrated in FIG. 8 (described below). This mapping facilitates binding of universal profile data to the element object 706 which allows for auto population of a form with form content data obtained from a universal profile stored at the server 304.

The binary document 702 includes metadata. The metadata is used by the ontology mapping module 704 to map the document 422 to the universal profile ontology data structure. The ontology mapping module 706 may be configured to perform machine learning and other auto translation methods. Auto translation methods used may include computer vision techniques, natural language processing ("NLP") techniques, or other relevant machine learning techniques.

The metadata of the binary document 702 is used by the ontology mapping module 706 to manage translations of the binary format document 702 into one or more other formats, segmentation of form fields in the translated document, mapping of segments of form fields into element attributes 424, mapping of element attributes 424 into element attribute descriptors 426, and mapping of element attribute descriptors 426 into element attribute descriptor representation specifications 428.

Once generated, the element object 706 is stored in an element provider bin 440*b*. The element provider bin 440*b* may be local to the element provider providing the form document 422. The bin 440*b* may contain other element objects (form templates).

The element object 706 may also be added or promoted from the element provider bin 440*b* to a repository 432. The repository 432 may be a system-wide repository of form templates. The bin 440*b* to repository 432 process here includes the form (element object 706) being "filled" by universal profile data.

Referring now to FIG. 8, shown therein is a graphical representation of a conversion process or mapping 800 of the element object (form template) 706 of FIG. 7 to a universal profile ontology data structure 802, according to an embodiment. The mapping 800 may be performed by the server 304 of FIG. 5 or the form mapping engine 1128 of FIG. 11.

The conversion process 800 may be local to the element (form template) provider 316.

Generally, the conversion process 800 generates an ontology specification (or element attribute ontology specification) 804 for each of the element attributes 424 in the element object 706. FIG. 8 illustrates the conversion process 800 for a phone number element attribute 806, which generates the phone number element attribute ontology specification 804. The ontology specification 804 may be local to the element provider 316. The universal profile ontology 802 may also include ontology specifications for the name element attribute and the address element attribute in the element object 706 generated by the conversion process 800. The ontology specification 804 may undergo an ontology promotion process, such as in FIG. 9, to generate a system-wide ontology specification.

The phone number ontology specification includes an element attribute 424 and an element attribute descriptor 426 and corresponding instances 810, 812. The ontology specification 804 also includes an element attribute descriptor representation specification 428. The element attribute descriptor representation specification 428 includes a format 430, a storage 432, and a validation 434 and corresponding instances 814, 816, and 818.

As a result of the conversion process 800, the phone number element attribute 806 is mapped 808 to the ontology specification 804 in the universal profile ontology 802.

Figure 9:
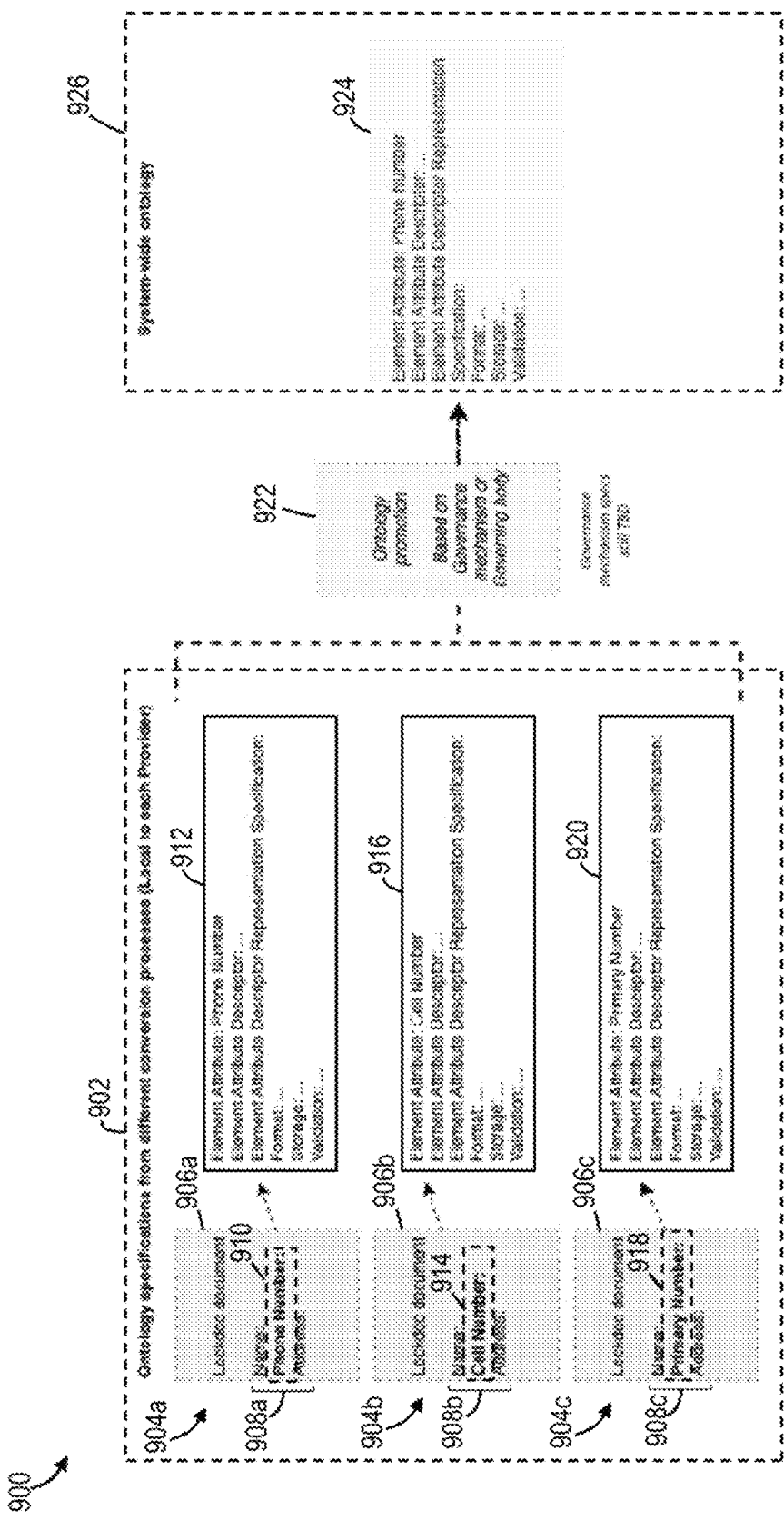
FIG. 9 is a graphical representation of an ontology promotion process performed by the system of FIG. 5, according to an embodiment.

Referring now to FIG. 9, shown therein is an example universal profile ontology promotion process 900, according to an embodiment. The ontology promotion process 900 may be performed by the server 304 of FIG. 5 or the form mapping engine 1128 of FIG. 11. The ontology promotion process 900 may provide a promotion and governance mechanism for the object models of the system 300.

The process 900 may be performed to "promote" element attribute ontology specifications from a local status to a system-wide status. In the local status, the ontology specification is local to the element provider. In the system-wide status, the ontology specification is included in a system-wide universal profile ontology. Promotion to system-wide status may result in a single ontology specification in the system-wide ontology that represents (and maps to) fields in different element objects where the fields receive the same type of information (and thus where it may be advantageous for such different fields to be treated the same way in the ontology). For example, multiple such fields (element attributes) may be identified (e.g. by the ontology promotion module 922) for promotion consideration where multiple element attributes are of the same essential character and that will likely fulfill an equivalent purpose to one another and thus may be generalized to a single instance of element attribute and thus ontology specification. The system may be configured to implement a process whereby the ontology inventory of local forms is performed at any time there is a change in the system. A change in the system may include, for example a new form template being added, or a new document being added (e.g. by the user).

The ontology promotion process 900 includes a plurality local conversion processes 902. The local conversion processes 902 may function similarly to the conversion process or mapping 800 of FIG. 8. The local conversion processes 902 are performed by the server 304 in a manner that is local to each element provider 316. The local conversion processes 902 includes a first local conversion process 904*a*, a second local conversion process 904*b*, and a third local conversion process 904*c*. The local conversion processes 904*a*, 904*b*, 904*c* are referred to generically as local conversion process 904.

Generally, the local conversion process 904 generates an ontology specification (or element attribute ontology specification) for each of the element attributes 424 in the element object 706, such as described in FIG. 8.

The process 900 includes a plurality of element objects (form templates or documents) 906*a*, 906*b*, 906*c* (referred to collectively as element objects 906 and generically as element object 906). Each element object 906 includes a plurality of form fields or element attributes 908*a*, 908*b*, 908*c*. The element objects 906 may have been generated using the processing pipeline 700 of FIG. 7. The process of generating the element object 906 from a binary document may include any one or more of translation, mapping, and segmentation processes.

The element attributes 908*a* of element object 906*a* include a phone number element attribute 910. The phone number element attribute 910 is converted to a corresponding phone number ontology specification 912 in the data ontology. The conversion process generates a mapping between the phone number element attribute 910 and the phone number ontology specification 912. The phone number ontology specification 912 is local to the element provider that provided the element object 906*a* to the system 300.

The element attributes 908*b* of element object 906*b* include a cell number element attribute 914. The cell number element attribute 914 is converted to a corresponding cell number ontology specification 916 in the data ontology.

The element attributes 908*c* of element object 906*c* include a primary number element attribute 918. The primary number element attribute 918 is converted to a corresponding primary number ontology specification 920 in the data ontology.

The ontology specifications 912, 916, 920 each include an element attribute instance, an element attribute descriptor instance, and an element attribute descriptor representation specification instance. The element attribute descriptor representation specification instance includes a format, a storage, and a validation (such as in FIG. 8).

The promotion process 900 uses an ontology promotion module 922. The ontology promotion module 922 is executed at the server 304. Execution of the ontology promotion module 922 may include input from a data custodian 406.

The ontology promotion module 922 receives the ontology specifications 912, 916, 920 and determines whether a given ontology specification 912, 916, 920 is promoted to a system-wide ontology specification and the composition of that system-wide ontology specification (i.e. what that system-wide ontology specification looks like).

The ontology promotion decision performed by the ontology promotion module 922 is based on a governance mechanism or governing body. The ontology (which is a schema)

grows between the universal profile data and the form data. The governance function in between helps to maintain the balance between those two aspects of the schema building. Each attribute in the schema (or ontology) may have metadata for example to express privacy or security requirements. These aspects are maintained and managed by a governance mechanism prior to promotion. There may also be an aspect of standardization that is managed by the governance mechanism.

Element attributes may be promoted to a system-wide ontology. Element attribute promotion candidacy and eventual approval, adjustment, or rejection, is controlled by an ontology governance mechanism implemented by the ontology promotion module 922. The ontology governance mechanism may be at the sole discretion of the system provider or may be transferred to a governing organization such as a standards body. Where the ontology governance mechanism is transferred to a governing organization or body, the governance entity (which may be an organization or an individual) may have a user access role with an ability to log into the system to express requirements, decisions, etc. of the governance entity. In some cases, it may also be also possible that, at the discretion of the governing body/mechanism, standard ontologies are imported into the system, or via APIs there are connectors to other standards setting systems or documents. In such cases, there may be no "transfer" of the ontology governance mechanism occurring, rather the governance entity may just be an admin role in the system.

If a promotion determination is made by the ontology promotion module 922, a system-wide ontology specification 924 is generated and promoted (i.e. added) to a system-wide universal profile ontology 926.

In such a case, the decision to promote may be made based on similarities between different element attributes in their respective element attribute descriptors or element attribute descriptor representation specifications. For example, the element attributes phone number 910, cell number 914, and primary number 918 may have similar element attribute descriptors and representation specifications (because they are all phone numbers) and may thus be represented in the system-wide ontology 926 by a single system-wide ontology specification 924 that reflects a phone number. The system-wide ontology specification 924 includes an element attribute, an element attribute descriptor, and an element attribute descriptor representation specification including a format, a storage, and a validation.

Ontology specifications including element attributes, element attribute descriptors, and element attribute descriptor representation specifications, such as specifications 912, 916, and 920, are initially local to the element as defined by the element provider (form template provider) through a user interface and/or a programmatic specification (JSON, YAML, and/or via API in a language such as Python, Java, etc., or via a REST or other network-based API).

Figure 10:
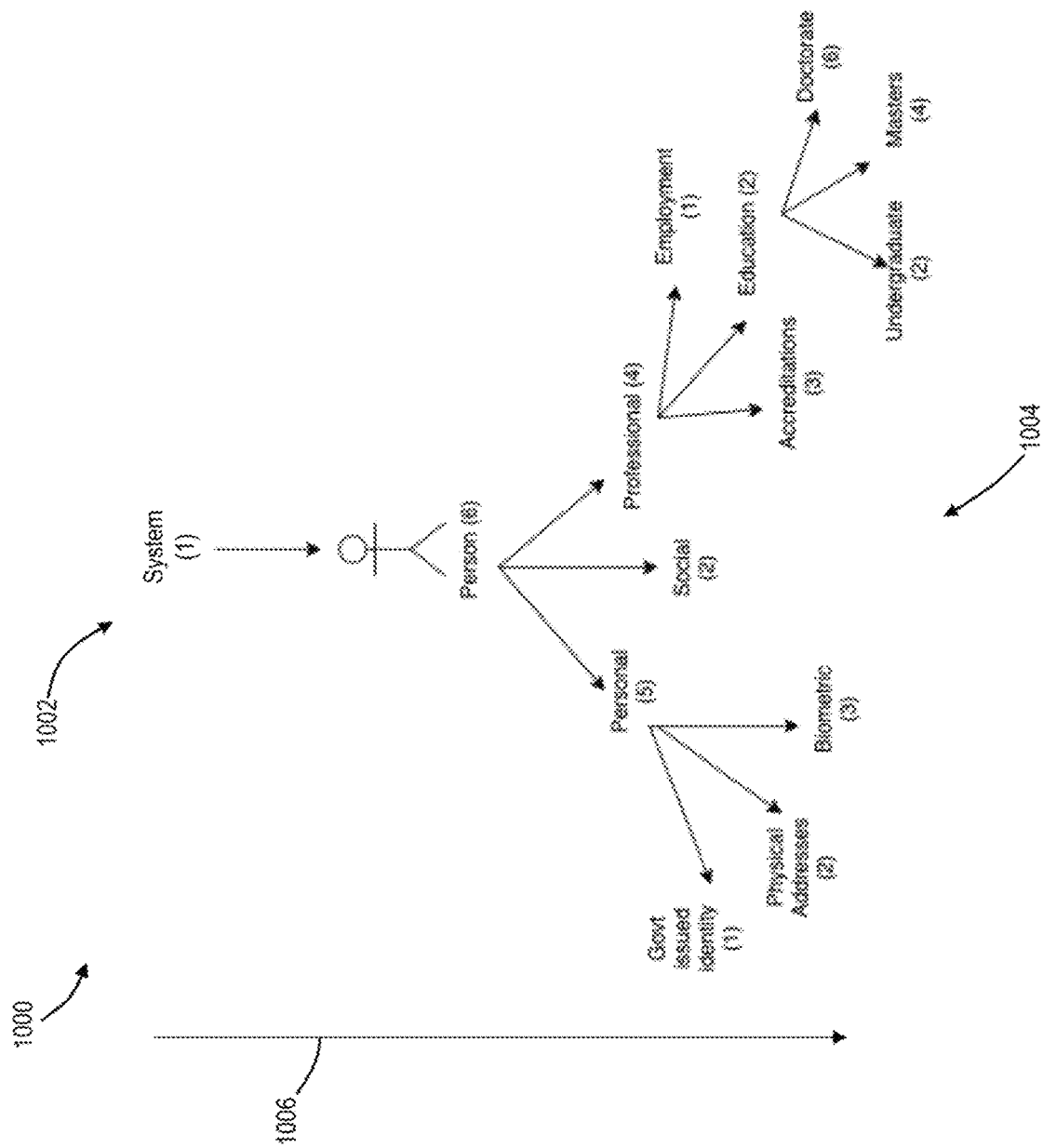
FIG. 10 is a graphical representation of an example system ontology for a universal profile having a tree-like structure, according to an embodiment.

Referring now to FIG. 10, shown therein is an example system ontology 1000 for a universal profile, according to an embodiment. The system ontology 1000, and corresponding universal profiles, are stored and populated at the server 304 of FIG. 5.

As illustrated, the system ontology 1000 is a data structure having a tree-like structure. The tree structure includes a plurality of nodes. The nodes can be populated with various types of data which correspond to information about a data owner user to provide a universal profile (instance of the ontology 1000).

The system ontology 1000 includes a root end 1002 that progresses to a leaf end 1004. Population of the universal profile instance of the system ontology 1000 may be performed by the server 304 in a root-to-leaf direction 1006 starting at the root 1002. The ontology 1000 may be configured, as in FIG. 10, such that more basic or generic information about the data owner user is stored at nodes closer to the root 1002, while more domain-specific information about the data owner user is stored at nodes closer to the leaf end 1004.

In the example of FIG. 10, System.Person.Professional.Education.Masters .1.6.2.4 holds information on masters degree(s).

Population of the system ontology 1000 to generate a universal profile instance may start with the user entering root information, such as address information. In some embodiments, the server 304 (or virtual data custodian) may be configured to ask for the root information (e.g. via a conversational user interface). As the user engages with other forms in the system, the tree may be expanded or further populated to include whatever additional information is needed by the requesting party (i.e. whatever form content data is required by the form that has been mapped by the server 304 that is not already present in the universal profile of the user). Such population is facilitated by user interaction with the system via a user interface executing at the user device.

As an example, a data owner user may, in populating data into their universal profile, add information indicating that their profession is "lawyer". A virtual custodian implemented by the system 300 may be configured to determine what information is needed or should be acquired from the user next to populate the universal profile further. The virtual custodian may make such a determination based on a completion state of the universal profile that is stored by the server 304. The completion state represents the boundary in the tree structure between the root and the leaves not yet populated. The virtual custodian may generate and pose a question (e.g. determine a "next question") to the user via the user interface that is designed to collect information not yet populated.

Figure 11:
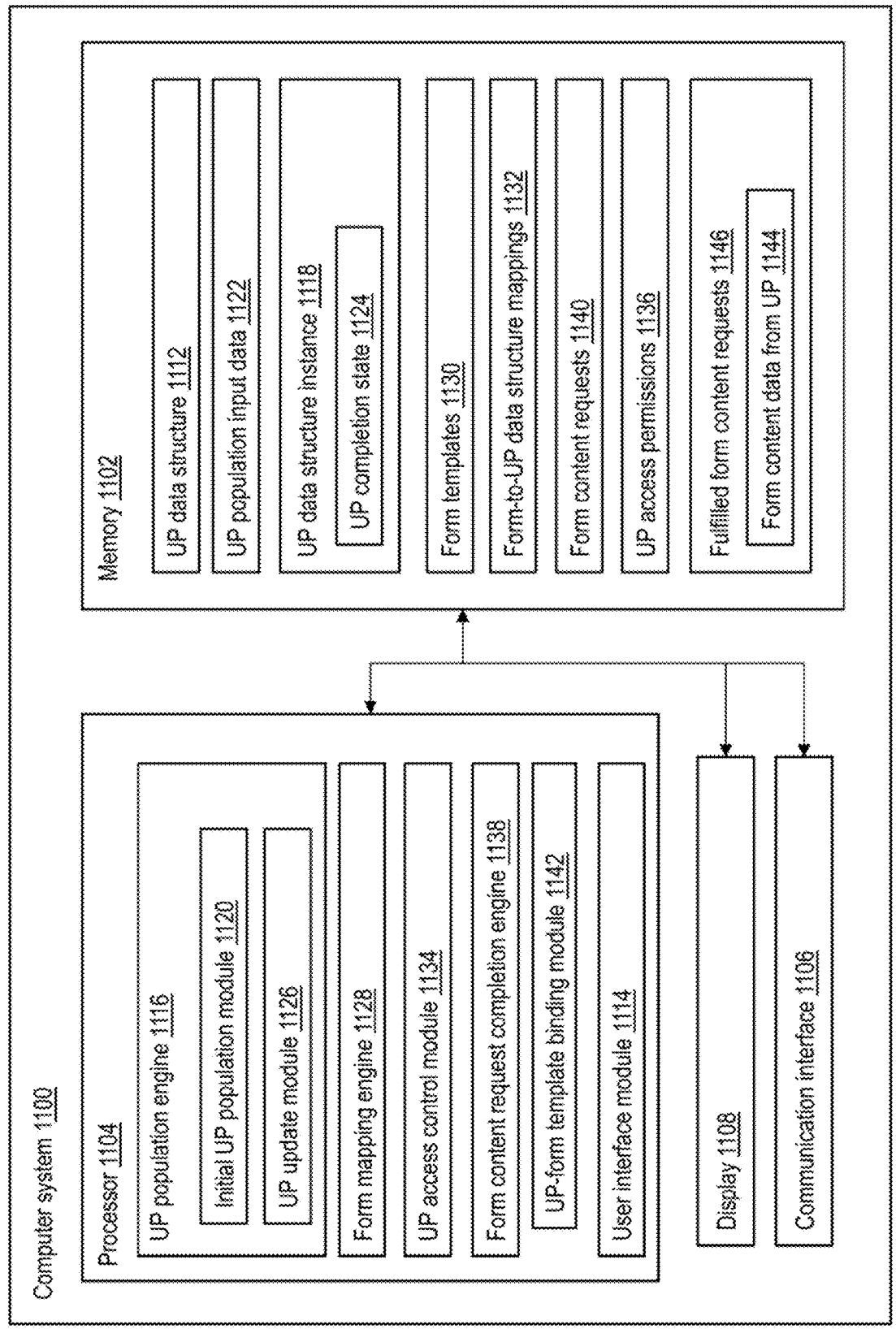
FIG. 11 is a block diagram of a computer system for processing forms, according to an embodiment.

Referring now to FIG. 11, shown therein is a computer system 1100 for automatically processing forms, according to an embodiment. The system 1100 may be implemented by the system 10 of FIG. 1 or the system 300 of FIG. 3.

Components of the computer system 1100 may be implemented at one or more devices, such as a server platform (e.g. server platforms 12, 304 of FIGS. 1, 3) and a user device (e.g. user devices 302 of FIG. 3).

The system 1100 may be used by data owner users (content provider users), requesting party users, and form template provider users.

The data owner users provide form content to the system 1100, which is stored as a universal profile of the data owner user (described below). Form content is information about a subject or entity (e.g. individual, organization) that is collected by a form. As previously noted, the subject or entity of which the form content is about may be the data owner itself, or may be another subject or entity. Also, a given data owner user may have a universal profile for a plurality of different subjects or entities.

The requesting party users request and consume form content from one or more data owner users through the system 1100. The form content is obtained from the universal profile of a data owner user.

The form template provider users provide form templates to the system 1100. The form templates are mapped to a universal profile data structure (described below). The form template (and more particularly the mapping thereof) dictates what form content is accessed and obtained from the universal profile of the data owner user.

A single user may be any one or more of a data owner user, a requesting party user, and a form template provider user. For example, a requesting party user may also be a form template provider user.

The system 1100 includes a memory 1102 and a processor 1104 in communication with the memory 1102. The processor 1104 and memory 1102 may be located at the server 304 of FIG. 3.

The system 1100 includes a communication interface 1106 for transmitting and receiving data. The communication interface 1106 may include a network interface.

The system 1100 includes a display 1108 for displaying data generated by the system 1100. The display 1108 may be located at the user device 302.

The memory 1102 stores a universal profile ("UP") data structure 1112. The UP data structure 1112 may comprise a data ontology. The data ontology may be implemented using a tree-like structure. The UP data structure 1112 may be updated or evolve over time. The UP data structure 1112 may comprise a plurality of ontology specifications. The ontology specifications may be mapped to element attributes, which are representations of form fields, present in one or more form templates in the system 1100.

The processor 1104 includes a user interface module 1114. The user interface module 1114 is configured to generate a user interface. The user interface is displayed via the display 1108. The user interface module 1114 facilitates the user's interaction with the system 1100. The user interface is configured to receive input data provided by the user and output data generated by the system 1100 to the user.

The user interface module 1114 is configured to interface and communicate with one or more other modules or engines located at the processor 1104 such as by providing input data to the module or engine or receiving output data from the module or engine.

The processor 1104 includes a UP population engine 1116. The UP population engine is configured to populate an instance of the UP data structure instance ("UP") 1118 with user information. The UP data structure instance 1118 is stored in the memory 1102.

The UP population engine 1114 includes an initial UP population module 1120.

The initial UP population module 1120 is used to perform initial population of the UP data structure instance 1118. The initial UP population module 1120 may be invoked when a data owner user first logs into the system 1100.

Figure 12:
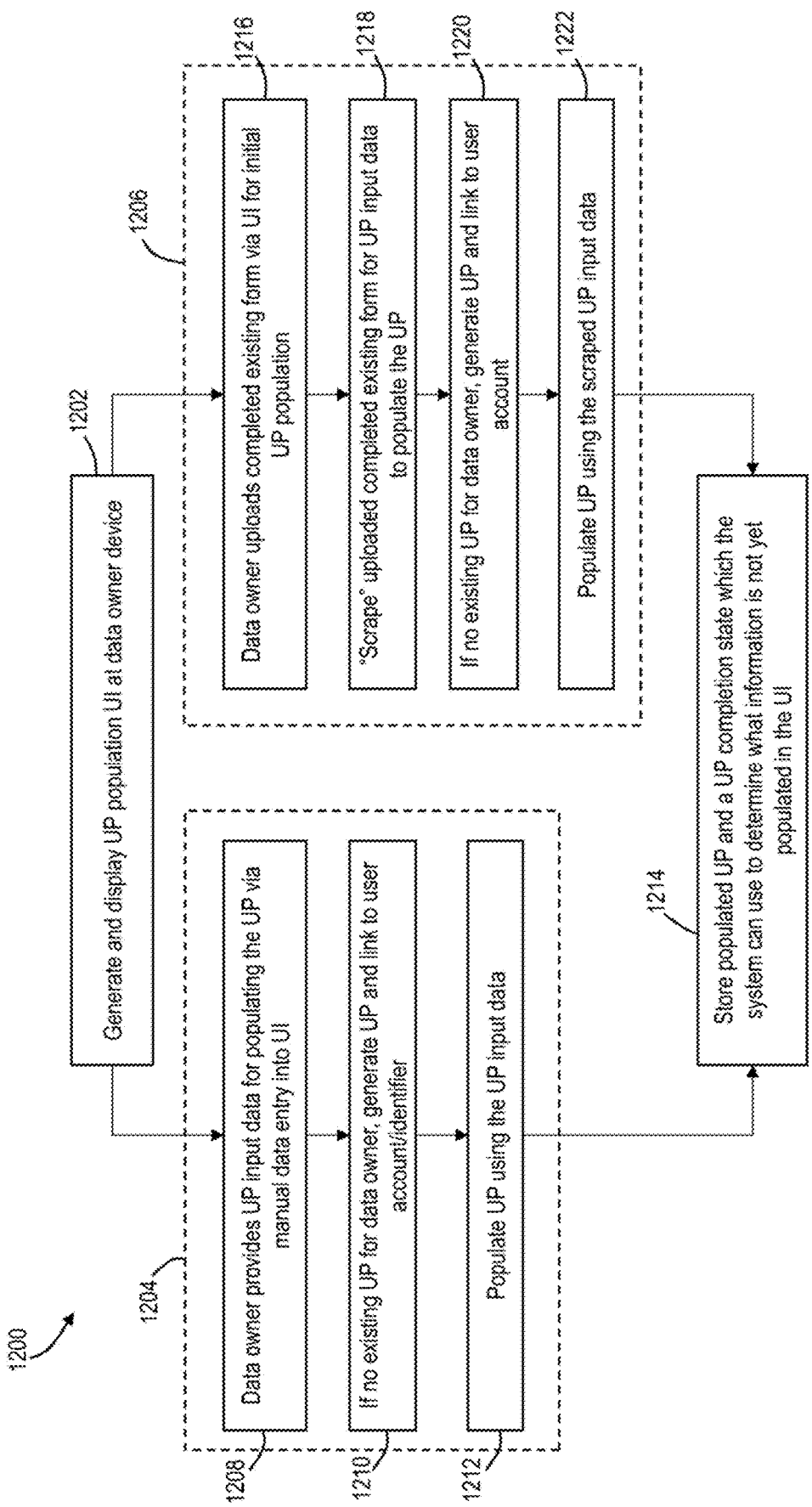
FIG. 12 is a flowchart of a method of populating a universal profile instance implemented by the system of FIG. 11, according to an embodiment.

The initial UP population module 1120 may execute a workflow such as described in FIG. 12.

Generally, the user interface module 1114 generates and displays an initial UP population user interface at the user device 302. The data owner user inputs data into the initial UP population user interface to populate the UP 1118. The inputted data is stored in the memory 1102 as UP population input data 1122. The inputted data may be provided via manual data entry into the user interface. The inputted data may be a previously completed form from which the UP population input data 1122 can be extracted by the initial UP population module 1120.

Once received, the initial UP population module 1120 uses the UP population input data 1122 to populate the UP 1118. The populated UP 1118 is stored in the memory 1102.

The UP population engine 1116 is configured to determine and maintain a UP completion state 1124 for the UP 1118. The UP completion state 1124 is stored in the memory 1102. The UP completion state 1124 indicates which parts of the UP data structure 1112 have been populated and which parts are unpopulated. In some embodiments where the UP data structure 1112 has a tree-like structure, the completion state 1124 may represent the boundary between populated data items and unpopulated data items. The completion state 1124 may be used by the UP population engine 1116 to determine whether to request further UP population input data 1122 from the user and what type of UP population input data 1122 to request.

The UP population engine 1116 also includes a UP update module 1126. The UP update module 1126 is configured to facilitate updating the UP 1118 with further UP population input data 1122. The UP update module 1126 may determine what UP population input data 1122 to request from the user. The UP update module 1126 may determine whether to make such requests and what information should be requested based on any one or more of updates to the UP data structure 1112, the UP data structure instance 1118, and the UP completion state 1124.

The processor 1104 includes a form mapping engine 1128 for mapping a form template 1130 to the UP data structure 1112. Form templates 1130 may be uploaded to the system 1100 via the user interface module 1114 and stored in the memory 1102. The form template 1130 includes a plurality of form fields for receiving form content data about a data owner user.

The form mapping engine 1128 is configured to receive a form template 1130 as input and generate a form-to-UP data structure mapping (or "form mapping") 1132. The form mapping 1132 is stored in the memory 1102. The form mapping 1132 is used by the system 1100 when retrieving form content from a UP data structure instance 1118 to "fill out" a form. The form mapping 1132 may include mappings of one or more form fields (or element attributes) in the form template 1130 to element attribute specifications in the UP data structure 1112.

The form mapping 1132 may also be used by the system 1100 to update the UP data structure 1112.

The processor 1104 also includes a UP access control module 1134. The UP access control module 1134 controls whether a requesting party user can access and obtain form content from a UP instance 1118 and what data items in the UP instance 1118 can be accessed. The UP access control module 1134 references UP access permissions 1136 in determining what data items in the UP 1118 the requesting party user can access. The UP access permissions 1136 are stored in the memory 1102. The UP access permissions 1136 are set by the data owner user via the user interface module 1114. The UP access permissions 1136 may be set in response to a form content request (as described below).

The processor 1104 also includes a form content request completion engine 1138.

The form content request completion engine 1138 responds to form content requests 1140 from requesting party users. A form content request is a request made by a requesting party user for form content from a data owner user (and for access to the UP 1118 of the data owner user to obtain the form content). The form content requests 1140 are submitted to the system 1100 via the user interface module 1114. The form content requests 1140 are stored in the memory 1102. The form content request 1140 may be a form template submission.

The form content request 1140 may include a form template identifier specifying a form template 1130 and a data owner user identifier specifying a data owner user.

Generally, the form content request 1140 contains enough information for the system 1100 to identify the relevant form template 1130 and the data owner user.

The form content request completion engine 1138 may inquire from the data owner user via the user interface module 1114 whether to permit the requesting party to access the UP 1118 for the purposes of obtaining the form content. The user interface module 1114 may display the identifying information of the requesting party and, in some cases, identifying information of the form template 1130. When the data owner user permits access, the form content request completion engine 1138 stores the permitted access in memory 1102 as UP access permissions 1136.

In some cases, the form content request completion engine 1138 may reference the UP access permissions 1136 of the data owner user specified in the form content request 1140 to determine whether to provide the requesting party with access to the UP 1118 (fulfill the request). This may be performed prior to asking the data owner user via the user interface module 1114. If permission is present and valid, the form content request completion engine 1138 may proceed with completing the form content request 1140. If there is no valid permission, the form content request completion engine 1138 may inquire from the data owner user via the user interface module 1114 whether to permit access as described above.

The form content request completion engine 1138 utilizes the UP access control module 1134 when determining whether permission for a requesting party user to access a UP 1118 is present and valid.

Once it is confirmed by the form content request completion engine 1138 that the requesting party user sending the form content request 1140 has permission from the data owner user to access the UP 1118, the form content request completion engine 1138 executes a UP-form template binding module 1142 (or "binding module 1142").

The binding module 1142 obtains form content data 1144 from the UP 1118 using the form mapping 1132 of the specified form template 1130.

The form content request completion engine 1138 generates a fulfilled form content request 1146 including the form content data 1144 obtained by the binding module 1142.

The fulfilled form request 1146 may be a completed form comprising the form template 1130 filled with the form content data 1144.

The fulfilled form content request 1146 may not be a completed form. For example, the fulfilled form request 1146 may include the form content data 1144 without the form template 1130 (formless workflow).

The form content request completion engine 1138 may fulfill the form content request 1140 in a formless context by provisioning the form content data 1144 to the requesting party user. In some cases, the format of the fulfilled form content request 1146 may be configured to match or map to a format in which the extracted data enters a requesting party data system. Provisioning the form content data 1140 in a formless workflow may include a mapping between the canonical information side (universal profile data structure 1112) and the actual consuming or requesting party information system.

The form content request completion engine 1138 may fulfill the form content request 1140 in a formless context by verifying the form content data 1144 and provisioning confirmation of the verification to the requesting party. The verification of form content data 1144 may be advantageous in situations where the requesting party user just needs verification that the form content data 1144 has been checked for compliance purposes.

The formless workflow functionality of the form content request completion engine 1138 may advantageously avoid the steps of completing or populating the form template 1130 with the form content and the requesting party extracting the form content from the form into their data system.

In some cases, the form content request 1140 may specify whether the request is for formless provision of form content data or provision of a completed form and the form content request completion engine 1138 carries out the appropriate form-based or formless workflow to generate the fulfilled form content request.

Referring now to FIG. 12, shown therein is a method 1200 of populating a universal profile data structure instance, according to an embodiment. The method 1200 may be performed by the computer system 1100 of FIG. 11 or the system 300 of FIG. 3. In particular, the method 1200 may be performed by the UP population engine 1116 and the user interface module 1114. The universal profile data structure instance may be the UP instance 1118 of FIG. 11.

The method 1200 is used to enable a data owner user to populate a UP instance 1118.

At 1202, a universal profile population user interface ("UI") is generated and displayed at the data owner user device (e.g. device 314 of FIG. 3). The UP population UI may be implemented by the user interface module 1114 of FIG. 11.

The UP population UI may include two different workflows for providing UP population input data 1122 to the system to populate the UP 1118. The workflows include a manual data entry workflow 1204 and a document upload workflow 1206.

The user may select via the user interface whether to proceed with the manual data entry workflow 1204 or the document upload workflow 1206.

Referring now to the manual data entry workflow 1204, at 1208 the data owner user provides UP population input data 1122 for populating the UP instance 1118 via manual data entry in the user interface.

At 1210, the system 1100 determines whether the data owner user has a UP instance 1118 presently in the system. If no UP 1118 is found, the system 1100 generates a new UP data structure instance 1118. The UP instance 1118 may be linked by the system 1100 to the data owner user (such as through a user account or user identifier). The determination of whether there is an existing UP 1118 and generation of a new UP 1118 may be performed by the UP population engine 1116.

At 1212, the UP instance 1118 is populated using the UP population input data 1122 provided at 1206. The UP population may be performed by the UP population engine 1116.

At 1214, the populated UP instance 1118 is stored in the system 1100. A UP completion state 1124 is determined for the populated UP instance 1118 and stored. The UP completion state 1124 can be used (e.g. by the UP population engine 1116) to determine what information (data items) in the UP 1118 is not yet populated. The processes at 1214 may be performed by the UP population engine 1116.

Referring now to the document upload workflow 1206, at 1216, the data owner user uploads one or more completed existing forms via the UI for populating the UP 1118. Generally, a completed existing form comprises a form template including a plurality of form fields and form content data about the data owner user entered into the form template using the form fields.

At 1218, the uploaded completed existing form is scraped using a data scraping tool or the like for UP population input data 1122 to populate the UP 1118.

At 1220, the system 1100 determines whether the data owner user has a UP instance 1118 presently in the system as at 1210 of the manual entry workflow 1204.

At 1222, the UP instance 1118 is populated using the UP population input data 1122 scraped from the uploaded completed existing form.

At 1214, the populated UP 1118 (with the scraped data) is stored along with a UP completed state 1124 previously described.

Figure 13:
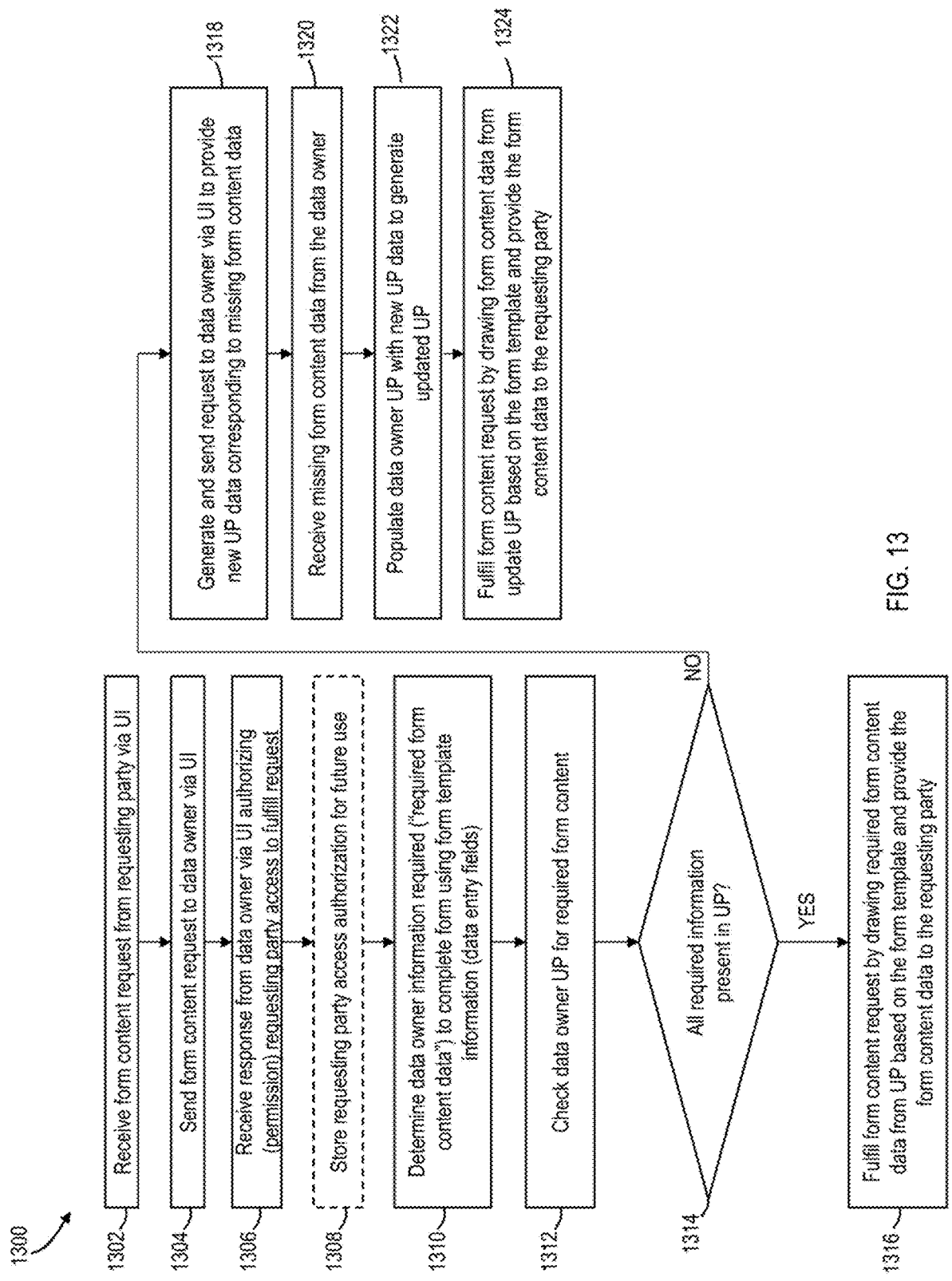
FIG. 13 is a flowchart of a method of requesting and fulfilling form content requests implemented by the system of FIG. 11, according to an embodiment.

Referring now to FIG. 13, shown therein is a method 1300 of fulfilling a requesting party form content request using form content data obtained from a universal profile of a data owner user, according to an embodiment. The method 1300 may be performed by the computer system 1100 of FIG. 11 or the system 300 of FIG. 3. In particular, the method 1300 may be performed by the form content request completion engine 1138, the UP access control module 1134, and the user interface module 1114. The universal profile data structure instance may be the UP instance 1118 of FIG. 11. The form content request may be the form content request 1140 of FIG. 11.

The method 1300 is used to enable a requesting party user to access and obtain form content data from a universal profile instance of a specified data owner user.

At 1302, a form content request 1140 user is received by the system 1100 from a requesting party via the UI. The form content request 1140 may specify a form template and a data owner user.

At 1304, the form content request 1140 is sent to the data owner user specified in the form content request 1140 via the UI.

At 1306, a response is received from the data owner user via the UI granting permission to the requesting party user to access the UP instance 1118 of the data owner user to obtain the form content data required by the specified form template.

Optionally, at 1308, the access authorization provided by the data owner responses at 1306 may be stored by the system 1100 for future use. The stored access authorization may be referenced by the system 1100 when a future form content request is received (as at 1302). If the form content request is of the same nature (e.g. same form template, same form content required, same data owner user, etc.), the system may determine access authorization is present and valid and skip steps 1304, 1306. This may advantageously reduce the burden on the data owner user to respond to a request that has previously been authorized. This may apply, for example, when the same form has to be filled out periodically.

At 1310, the system 1100 determines what information from the UP instance 1118 is required to fulfill the request 1140. In other words, the system 1100 determines what form content data is required by the form template (i.e. what information is to be inputted to the form). This determination is made using form template information (i.e. what the form fields are in the form template). In an embodiment, the determination is made using the form mapping 1132, which is a mapping of the form template to the UP data structure 1112.

At 1312, the UP instance 1118 of the data owner user is checked for the required form content data. This includes, at 1314, a determination of whether all required form content data is present in the UP instance 1118.

If it is determined at 1314 that all required form content data is present in the UP instance 1118, the form content request 1140 is fulfilled by the system 1100 at 1316. Fulfilling the form content request 1140 includes obtaining or drawing the required form content data 1144 from the UP instance 1118. As noted, the form content data 1144 obtained is determined by the form template representation in the system 1100 (e.g. form mapping 1132). The form content data 1144 is provided to the requesting party user. Providing the form content data 1144 to the requesting party user may include generating a completed form comprising the form template populated with the form content data 1144. Providing the form content data 1144 to the requesting party user may include providing the form content data 1144 without generating a completed form (formless). For example, the form content data 1144 may be provided in a format that is ingestible or consumable by a data information system of the requesting party. In some cases, the form content data 1144 may be provided to the requesting party data information system directly.

If it is determined at 1314 that all required form content data is not present in the UP instance 1118 (i.e. some form content data is absent), a UP population request is generated and sent to the data owner user via the UI at 1318. The request specifies the missing form content data and requests the data owner user to provide additional UP population input data 1122 corresponding to the missing form content data via the UI.

At 1320, the missing form content data is received from the data owner user as UP population input data 1122.

At 1322, the data owner user's UP instance 1118 is populated with the newly received UP population input data 1122. This generates an updated UP instance 1118.

At 1324, the form content request 1140 is fulfilled by the system 1100 as at 1316 using the updated UP instance 1118.

Figure 14:
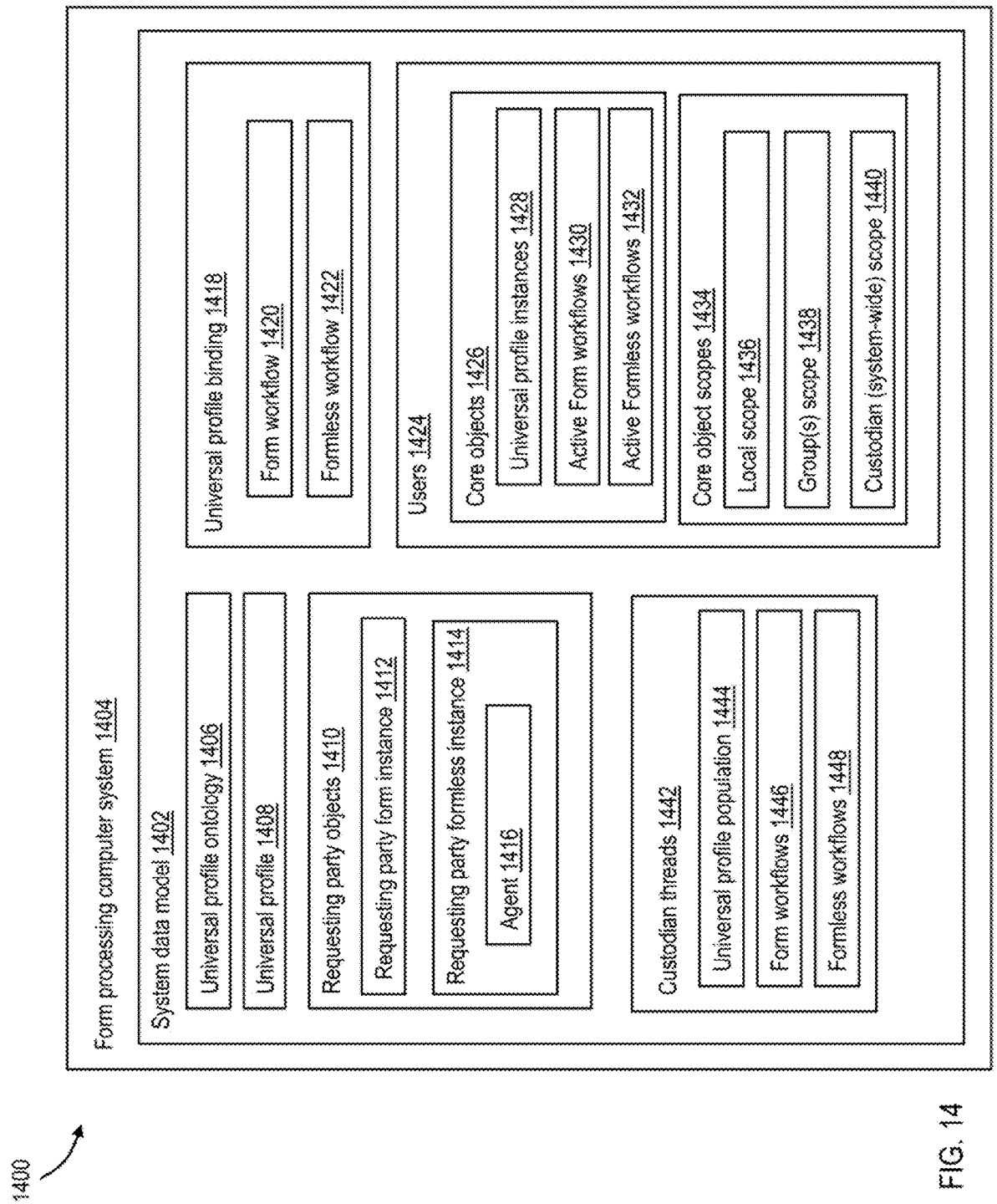
FIG. 14 is a block diagram of a system data model implemented by a form processing computer system, according to an embodiment.

Referring now to FIG. 14, shown therein is a block diagram 1400 of a system data model 1402 implemented by a computer system 1404 for processing electronic forms using a universal profile, according to an embodiment. The computer system 1404 may be the computer system 1100 of FIG. 11 or the servers 12, 304 of FIGS. 1 and 3.

The computer system 1404 includes and implements the data model 1402. The data model 1402 includes core data classes (in an object oriented sense) for the system 1404.

The data model 1402 includes a universal profile ontology ("UPO") 1406. The UPO may be the UP data structure 1112 of FIG. 11. The UPO 1406 provides a referencing system for form fields that appear in a corpus of information forms. The corpus of information forms is a defined set of paper forms or their digital representations. The information forms are be designed to record or collect various information about an individual (which may be an individual or a company), such as business information, professional information, personal information, etc.

The corpus may refer to a "system wide" form set. The system wide form set may or may not be universal. Forms in the corpus contain form fields (referred to herein as "attributes" or "element attributes"). The form fields/attributes map to the UPO 1406. The UPO 1406 may be a tree-like structure with defined schema. The UP 1406 may be inspired by the tree like structures, with defined schema, as defined in SNMP and MIB in computer networking systems (although being encoded in binary representations beyond the ASN.1 syntax used in SNMP).

The UPO 1406 is configured to evolve over time. The UPO 1406 may include a migration mechanism. The migration mechanism allows for multiple versions of the ontology data structure 1406 to exist and for translation between the multiple versions. The migration may function similarly to the types of migrations seen in full-stack development platforms, such as Rails.

The system data model 1402 includes a universal profile 1408. A universal profile 1408 is an instance (in an object-oriented sense) of a universal profile ontology 1406.

The universal profile 1408 includes a set of attributes. The set of attributes are filled out from the class template. Each attribute is mapped to a defined schema type (as in standard OOP). Because of the multiple class versions of the universal profile ontology 1406, and wide collection of potential attributes, the class instantiation of the universal profile 1408 may utilize meta-programming to manage the dynamic nature of the underlying class template 1406. Data attributes may also be symbolically linked between universal profile instances 1408. Such symbolic linkages may allow for single source of truth (SSOT) representations of underlying data (universal profiles 1408) in the system 1404.

The system data model 1402 includes requesting party objects 1410. A requesting party is a user who requires access to a universal profile 1408 of another user to obtain form content data (i.e. data that would typically be entered into form fields in the form) for that user. Relying parties who require access to a universal profile 1408 to obtain form content data (through a form or formless workflow) may provision universal profile 1408 access via a requesting party form instance 1412 or a requesting party formless instance 1414.

A requesting party form 1412 is an instance of a form. The form may have been uploaded to the system or provided by URL reference. The requesting party form (or simply, form) is populated using a form completion or population workflow (described below). The requesting party form is maintained in the system 1404 as a mapping between the input source and the overall universal profile ontology 1406. The mapping may be performed using computer vision and machine learning-based segmentation. The mapping may include management of different versions representing different points in time as the universal profile ontology 1406 changes. For example, while the mapping may be X on day 1, the mapping may be Y on day 1+n (e.g. day 400) due to a change in the universal profile ontology 1406. The mapping may include a specific mapping of form field (original form) to the universal profile ontology 1406.

A requesting party formless instance 1414 is a formless communication instance between the system 1404 storing the universal profile 1408 and the requesting party. The requesting party formless instances 1414 use a formless workflow to provide form content data to the requesting party via the universal profile 1408. The formless workflow may be used to connect with data in the universal profile ontology 1406 and universal profile instances 1408.

Formless communication between the system 1404 storing the universal profile 1408 and the requesting party requesting the form content data from the universal profile 1408 may be facilitated using an agent system (or "agent") 1416. The agent system 1416 may be a software component sitting or running on a requesting party user device that is connected to the system 1404 (e.g. sitting on the premise of the requesting party). The agent 1416 provides interaction between the universal profile ontology 1406 and universal profile instances 1408 and requesting party information systems.

The system 1404 is configured to perform universal profile binding 1418. The universal profile binding 1418 may be performed using a form workflow 1420 or a formless workflow 1422. The completion state (e.g. completion state 1124) covered section or portion of the universal profile 1408 is available for use with relying parties via the form or formless workflows 1420, 1422.

The form workflow 1420 is an instance of a workflow that binds a requesting party form object 1412 to a universal profile 1408. The form workflow 1420 may also facilitate a data custodian thread interface (described below). Form workflows 1420 may be made available in a user interface of the system 1404 using a bin/folder and file interface for managing the active set of instances.

The formless workflow 1422 is an instance of a workflow that binds a requesting party formless object 1414 to a universal profile 1408. The formless workflow 1422 may also facilitate a data custodian thread interface (as described below). Formless workflows 1422 may be made available in a user interface of the system 1404 using a bin/folder and file interface for managing the active set of instances. The formless workflow instances 1422 may also bind to the agent system 1416 (for facilitating communication to provide interaction between the universal profile ontology 1406 and universal profile instances 1408 and information systems of the requesting party) via the requesting party formless workflow object.

The data model 1402 includes user objects 1424. A user object 1424 contains references and collections of previously defined objects. The previously defined objects include core objects 1426. The core objects 1426 include universal profile instances 1428 and form workflows 1430 and formless workflows 1432. The universal profile instances 1428 include the universal profile instances for the user. In some cases, there may only be a single universal profile instance for the user. In other cases, the user may have (and be permitted to by the system to have) multiple universal profiles listed under the user (or multiple universal profiles instances may be listed under multiple users). Allowing a user to have multiple universal profile instances may be useful in certain form completion situations, such as a power of attorney.

The core objects 1426 include form workflow objects 1430 and formless workflow objects 1432. Collections of active form workflows 1430 and formless workflows 1432 are referenced in the user object 1424.

Each core object 1426 includes a core object scope 1434. A core object scope 1434 represents a scope level at which the core object 1426 can exist. The core object scope levels 1434 may include a local scope 1436. A core object 1426 having a local scope 1436 is available only to the local account. The core object scope levels 1434 may include a group (or groups) scope 1438. A core object 1426 having a group scope 1438 is available to a defined group. A group can contain multiple users. Users can be in multiple groups. Groups can have multiple administrators. The core object scope levels 1434 may include a custodian (or system-wide or corpus) scope 1440. A core object 1426 having a custodian scope 1440 has system-wide visibility.

The data model 1402 includes custodian threads 1442. The custodian threads 1442 provide threads of interaction and interface with users and relying parties.

The custodian threads 1442 include a universal profile population thread 1444. Population of the universal profile instance having a tree like structure may be performed in a root-to-leaf direction starting at the root. The universal profile population thread 1444 may include managing a frontier of needed information for the universal profile by the custodian. The frontier of needed information represents the boundary between the populated portion of the universal profile and the unpopulated portions of the universal profile and is determined using the completion state of the universal profile (i.e. the boundary between the root and leaves not yet populated).

The universal profile population thread 1444 may include an incremental workflow for populating the unpopulated data items of the universal profile instance. The incremental workflow may be a dialog between the data custodian and the data owner user that is determined and managed by the data custodian. For example, the data custodian may use machine learning techniques to determine what information is needed from the user and may generate and send inquiries to the data owner user, such as in the form of questions. The data owner user can respond in the user interface to the inquiries, such as by providing input data via manual data entry at the data owner device.

The custodian threads 1442 include a form workflow thread 1446 and a formless workflow thread 1448. The form and formless workflows 1446, 1448 represent the ways in which the requesting party can access and use universal profile data to obtain form content data.

The form and formless workflows 1446, 1448 may be incremental workflows that can be progressed through by the user and the data custodian. This may function similarly to the universal profile population. The incremental workflow may be an incremental dialog between the custodian and the user implemented via a user interface. Questions or other inquiries may be generated by the data custodian and sent to and displayed in user interface at the user device. The user may then provide input data to the user interface to provide an "answer" and to further the dialog, as necessary.

Figure 15:
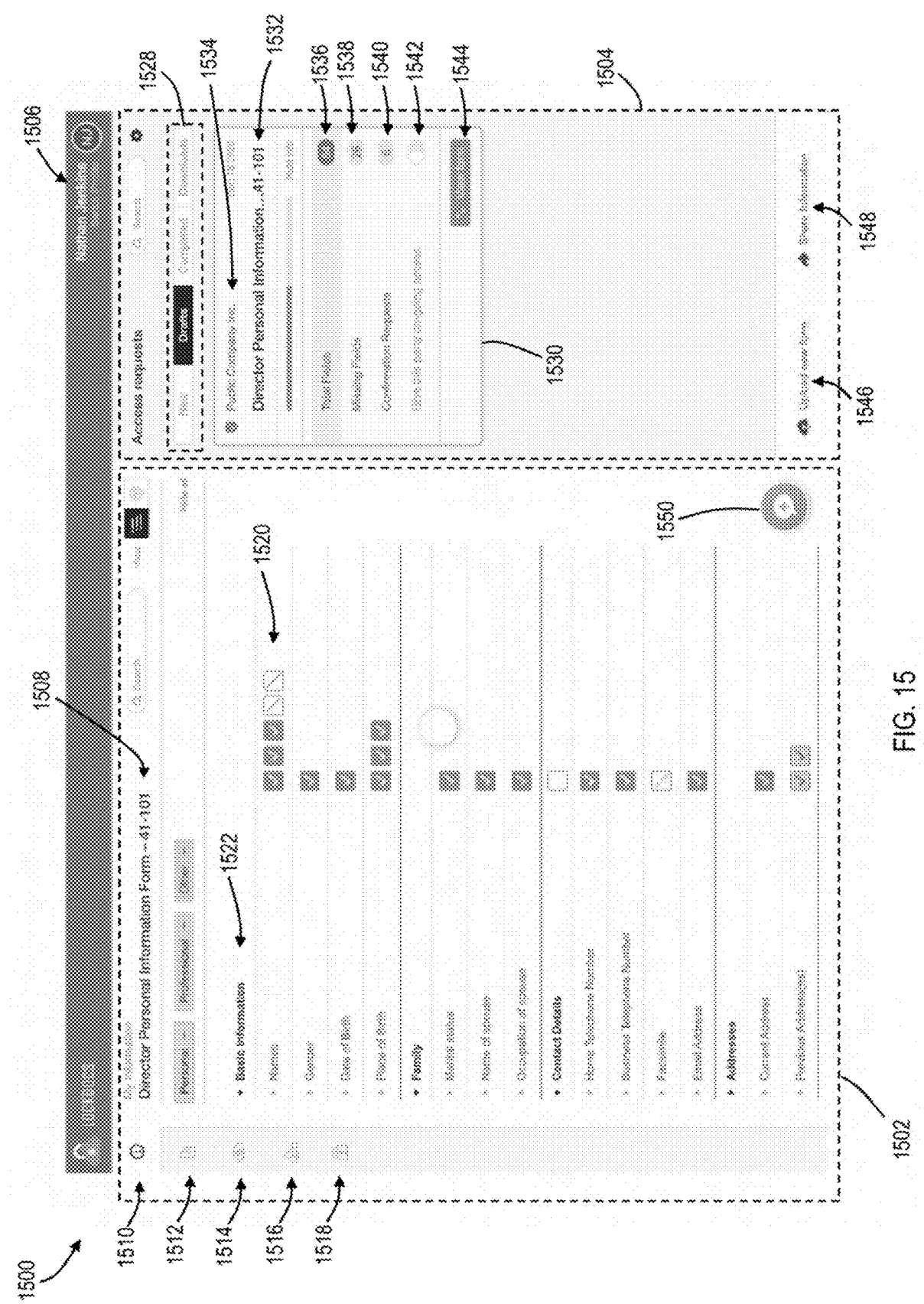
FIG. 15 is an example graphical user interface generated and displayed at a user device, according to an embodiment.
Figure 16:
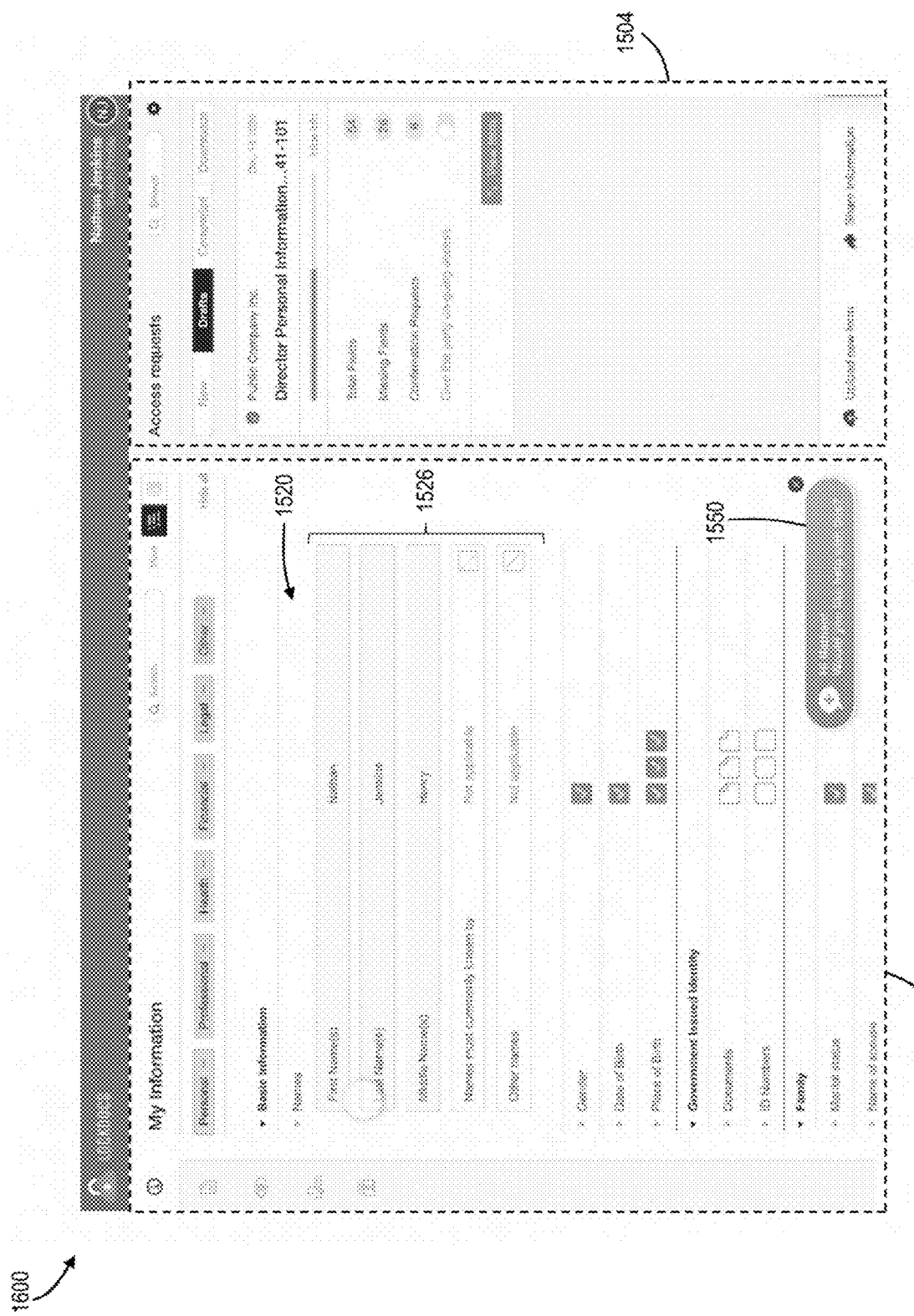
FIG. 16 is an example graphical user interface generated and displayed at a user device, according to an embodiment.
Figure 17:
FIG. 17 is an example graphical user interface generated and displayed at a user device, according to an embodiment.

Referring now to FIGS. 15 to 17, shown therein are example graphical user interfaces 1500, 1600, and 1700, respectively, generated and displayed by the system of the present disclosure, according to an embodiment.

The user interfaces 1500, 1600, 1700 are displayed on a user device, such as user device 302 of FIG. 3. The user device includes client side software components configured to generate and display the user interfaces 1500, 1600, 1700.

Generally, the user interfaces 1500, 1600, 1700 display various data stored and manipulated by the server platform (e.g. server platform 12 of FIG. 1 or servers 304 of FIG. 3, computer system 1100 of FIG. 11) and facilitate sending and receiving data to and from the server platform.

User interfaces 1500, 1600, 1700 are user interfaces that may be displayed on a data owner user device (e.g. device 14 of FIG. 1, device 314 of FIG. 3). In variations, user interfaces generated and displayed by the system may be tailored to specific user types (e.g. data owners, requesting parties) or may be generic user interfaces that can be used by any type of system user.

User interface 1500 shows a list view of a data owner universal profile. User interface 1600 shows list view details of the data owner universal profile of user interface 1500. User interface 1700 shows a vault view of the data owner universal profile of user interface 1500. Certain features labelled with reference numerals in FIG. 15 have not been so labelled in FIGS. 16 and 17 to simplify presentation but should be understood to be present in the user interfaces 1600, 1700.

User interfaces 1500, 1600, 1700 include a "my information" panel 1502 and an access request panel 1504. The my information panel 1502 displays universal profile information for the selected universal profile 1506 of the data owner. In the particular examples shown in FIGS. 15 to 17, the universal profile information is presented in the context of a selected form 1508 (Director Personal Information Form 41-101).

The my information panel 1502 includes selectable interface elements 1510, 1512, 1514, 1516, 1518. Selecting user interface element 1510 displays information data elements of the universal profile (shown in FIG. 15). Selecting user interface element 1512 displays documents that are stored in the universal profile. Selecting user interface element 1514 displays biometric information that is stored in the universal profile (and which can be used to authenticate the data owner when responding to form content (or access) requests). Selecting user interface element 1516 displays signatures that are stored in the universal profile (and that can be used to sign forms and other documents in the system). Selecting user interface element 1518 displays a user profiles UI including profile data for each user profile associated with the account. User may have one or more profiles associated with a user account.

In one example, an institutional user may have several user profiles associated with its user account. For example, an institution may include several subsidiary institutions, and therefore, the institutional user account may include corresponding profiles for each subsidiary. The institutional user may elect to apply differing user profiles depending on the specific use case. If profile data corresponding to a first institutional subsidiary is required, the user may select the user profile corresponding to the first institutional subsidiary. If profile data corresponding to a second institutional subsidiary is required, the user may select the user profile corresponding to the second institution subsidiary. In other examples, any number of user profiles may be included.

In another example, a personal user may have multiple user profiles associated with their user account. For example, a personal user account may include two user profiles, each corresponding to separate individuals (e.g. one corresponding to each individual in a marriage). The personal user may elect to apply differing user profiles depending on the specific use case. If profile data corresponding to a first individual is required, the user may select the user profile corresponding to the first individual. If profile data corresponding to a second individual is required, the user may select the user profile corresponding to the second individual. In other examples, any number of user profiles may be included.

User interface 1600 illustrates a scenario in which the "names" tab 1520 of the basic information tab 1522 in user interface 1500 has been selected by the user. As shown in FIG. 16, the names tab 1520 has expanded to show the different name information 1526 stored in the universal profile (first name, last name, middle name). Certain name information is displayed as not applicable to the particular form. Other tabs in the my information panel 1502 (e.g. place of birth, marital status) can be expanded similarly when selected.

User interfaces 1500, 1600, 1700 also include an access request panel 1504. The access request panel 1504 displays the various requests for form content data received from requesting parties in the system. The access request panel 1504 displays various categories 1528 of access requests including new, drafts, completed, and downloads. In user interfaces 1500, 1600, 1700, the drafts category has been selected and displayed.

The access request panel 1504 displays information 1530 for a particular form for which a form content request was received by the data owner account. This information 1530 includes the name 1532 of the form and the requesting party

1534. Further details are also displayed including a total number of fields 1536 in the form, a number of missing fields 1538 (fields to which data has not been provided) in the form, and a number of confirmation requests 1540. The access request panel 1504 also includes a user interface element 1542 that can be selected (toggled) to provide ongoing access to the requesting party (or to revoke such access). The access request panel 1504 also includes a user interface element 1544 that when selected by the user causes the user interface to display the form.

The access request panel 1504 also includes user interface elements 1546, 1548. User interface element 1546 can be selected by the user to upload a new form. User interface element 1548 can be selected by the user to share information (i.e. to share universal profile data).

The user interfaces 1500, 1600, 1700 also include a virtual assistant element 1550 that can be selected to converse with a machine learning-based virtual assistant for the purposes of helping to fill out or provide access to the universal profile. In user interface 1600, the virtual assistant has sent the data owner a message and the message has been displayed.

In user interface 1700, user interface element 1552 has been selected to show an iris or vault view 1554 of the information in the universal data profile in the my information panel 1502

As illustrated, the user interfaces 1500, 1600, 1700 can be used by the data owner to view various universal profile data, populate the universal profile, view and respond to universal profile access requests from requesting parties, provide access to universal profile data to requesting parties. Further the user interfaces 1500, 1600, 1700 can display various universal profile and access request information in the context of a particular form, as shown, including what information is required by the form, what information is still needed in the universal profile to complete the form, and what information required by the form is already populated.

Various advantages, features, and application use cases of the above described systems and methods will now be described.

The system may provide a fully digitized solution for enterprises that need to gather and verify The system may provide a fully digitized solution for enterprises that need to gather and verify stakeholder data (e.g. investors, employees, etc.) for compliance, regulatory, or record keeping purposes in a privacy compliant manner. The system may allow for full digitization of relevant workflows in a format that is determined by the enterprise.

The system provides, through consented sharing of data, a custodian for governing the secure exchange of data between enterprises (requesting parties) and their stakeholders (data owners). The system may enable sharing of the universal profile data through smart form population and execution, or as a "data exchange". The system provides a universal profile which may be an evergreen single source of truth for a data owner's personal or corporate identity.

In some embodiments, every time the data owner inputs data to populate the universal profile, the inputted data is stored and catalogued, resulting in an increasingly detailed data profile that can be used to provide data to additional third parties.

Using the system, the enterprise and its stakeholders may be able to execute, catalogue, and manage executed forms.

The system may avoid traditional problems associated with stakeholders (form content providers, data owners) sharing the same information time and time again, and in doing so reduce frustration, inefficiencies, out of data information, and potentially lost customers.

The system may solve problems related to compliance and privacy requirements associated with handling, receiving, or storing data about potentially sensitive data. Such requirements are on the rise and the system may help enterprises that need to be mindful of how they collect, use, and store personal information.

The system may provide an alternative to traditional approaches to storage of personal data and the provision of access to such information, for example, by providing a custodial structure that provides data owners with control over when their data is shared (with requesting parties) and a means to track shared data.

Embodiments of the system advantageously address the potential for "formless" provision of form content data, such as through the automated verification of such data where it resides, which addresses the potential scenario where forms, in the traditional sense, become obsolete.

The system provides for the automatic, digital, evergreen, and revokable exchange of data.

The system may allow for form upload, inviting stakeholders (i.e. data owners), tracking progress and collaboration, smart form completion, digital signature and form submission, exporting of data, searchable repositories of forms, automatic notification of profile changes (e.g. to requesting parties when a data owner's universal profile is updated), and processing of additional compliance and data requests.

The system may reduce time collecting, tracking, and reviewing forms. The system may provide greater accuracy and reduce risk of fraud over existing approaches. The system may provide for easier compliance with privacy and regulatory laws. The system may provide easy processing of updates to data owner information stored in a universal profile such as through notifications of applicable data owner profile changes.

The system may provide various benefits to data owners who use the system, such as significant time savings in providing form content, the potential to answer form questions only once, easy sharing of relevant universal profile data with permitted requesting parties via a user interface (e.g. one-click), tracking and revocation of data access permissions, and simple update and notification to requesting parties of changes to data owner profiles. The system may provide for management of multiple universal profiles under one data owner account. For example, a data owner account can have a first universal profile for the data owner and a second universal profile for a second individual (or entity), such as a family member, for whom the data owner is responsible, is authorized to act on behalf of, or over which they have control. Examples of cases in which management of multiple data profiles under a single account may be useful include minor dependents (i.e. a parent can act as a data owner in the system and the data owner account has a data profile for the parent and a profile for a minor dependent) and personal private entities (e.g. trust, corporation, partnership).

The system may store a universal profile of personal data. The personal data may include, for example, basic identity data, banking or payment information, biometric information (e.g. fingerprint, iris), officer and director positions, employment history, educational history, professional credentials, address history, vaccine history, or supporting documentation (e.g. passport, driver's license, health card).

The system may store a universal profile of corporate data. The corporate data may include, for example, banking or payment information, director and officer information, address information, key supporting documentation (e.g. articles of incorporation, by-laws, authorizing resolutions, signature samples). A corporate data profile (universal profile) may include various types of privately held entities including corporations, partnerships, trusts, or the like.

Embodiments of the system may employ various off the shelf frameworks, libraries, and technologies to implement the systems described herein. Front end software packages utilized may include ReactJS, Typescript, Sassy CSS, Storybook, and Selenium. Back end software packages utilized may include NodeJS, Typescript, and Google Firebase, including Cloud Firestore and Firebase Authentication. Other software and technology tools may be used to implement the systems described herein, including Bitbucket, Bitbucket Pipelines, Rollbar, DocuSign, PSPDFkit, and E3Kit.

While the above description provides examples of one or more apparatus, methods, or systems, it will be appreciated that other apparatus, methods, or systems may be within the scope of the claims as interpreted by one of skill in the art.

The invention claimed is:

1. A computer system for processing digital forms, the system comprising:
    a requesting party user device associated with a requesting party user and a data owner user device associated with a data owner user, the requesting party user and the data owner user being different entities, the requesting party user requesting access to digital information of the data owner user required by a digital form;
    the requesting party user device configured to:
        receive, via a user interface executing at the requesting party user device, a form content request specifying the requesting party user, the data owner user, and a form template, and transmit the form content request to a computer server via a first communication interface;
    the data owner user device configured to:
        receive, via a user interface executing at the data owner device, (i) universal profile population input data for populating a universal profile instance of a universal profile data structure and (ii) access permission data authorizing the requesting party user to access the universal profile instance to obtain form content data corresponding to the form template; and
        transmit the universal profile population input data and the access permission data to the computer server via a second communication interface; and
    the computer server configured to:
        store a mapping of the form template to the universal profile data structure;
        store the universal profile instance populated using the universal profile population input data and the access permission data;
        receive the form content request and determine, based on the access permission data, that the requesting party user specified in the form content request is authorized to access the universal profile instance of the data owner user specified in the form content request for the form template specified in the form content request;
        upon confirming the authorization of the requesting party to access the universal profile instance using the access permission data, fulfill the form content request including obtaining the form content data from the universal profile instance using the mapping and provisioning access to the form content data to the requesting party user device.

2. The system of claim 1, wherein the universal profile instance is stored by the computer server such that the universal profile instance is a single source of truth for the form content data in the system.

3. The system of claim 1, wherein data in the universal profile instance is stored as source data in a single location in the system with links or mappings to the source data, and wherein access to the source data is granted or revoked by the data owner user.

4. The system of claim 1, wherein the computer server stores the universal profile instance as a single source of truth for data in the universal profile instance using a distributed database system configured to proxy requests and access to an original provider of the source data.

5. The system of claim 1, where the computer server provisions the access to the form content data by reference and not by copy so that the universal profile instance functions as a single authoritative source in the system for data contained in the universal profile instance.

6. The system of claim 1, wherein the universal profile data structure comprises a plurality of element attribute specifications mapped to a set of form templates which includes the form template.

7. The system of claim 1, wherein the computer server is further configured to generate the mapping by automatically segmenting a form into form fields mapped to the universal profile data structure.

8. The system of claim 1, wherein the computer server is further configured to determine and store a completion state of the universal profile instance and determine from the completion state unpopulated data items in the universal profile instance.

9. The system of claim 1, wherein the universal profile data structure comprises a system-wide data ontology.

10. The system of claim 9, wherein the system-wide data ontology has a tree-like structure including a plurality of nodes, and wherein the nodes are populated with the universal profile population input data to populate the universal profile instance.

11. The system of claim 1, wherein the universal profile data structure functions as a canonical source of truth on how to structure form content data in the system.

12. The system of claim 1, wherein the computer server is further configured to:
    compare required form content data for the form template to a completion state of the universal profile instance to determine if any of the required form content data is absent from the universal profile instance;
    send a request for absent form content data to the data owner device;
    receive additional universal profile population input data corresponding to the absent form content data from the data owner user device;
    update the universal profile instance of the content provider user using the additional universal profile population input data; and
    fulfill the form content request using the updated universal profile instance.

13. A computer-implemented method for processing digital forms, the method comprising:
    storing, in a data storage device accessible to a computer server, (i) a universal profile of a data owner user, the universal profile comprising an instance of a universal profile data structure, and (ii) a mapping of a form template to the universal profile data structure;

receiving, at the computer server, a form content request from a requesting party user device associated with a requesting party user via a first network connection, the form content request specifying the requesting party user, a form template, and the data owner user, the requesting party user and the data owner user being different entities;

storing, in the data storage device accessible to the computer server, access permission data authorizing the requesting party user to access the universal profile instance to obtain form content data corresponding to the form template specified in the form content request, the access permission data received by the computer server from a data owner user device associated with the data owner user via a second network connection;

determining, by the computer server, based on the access permission data, that the requesting party user specified in the form content request is authorized to access the universal profile of the data owner user specified in the form content request to obtain form content data corresponding to the form template specified in the form content request; and upon confirming that the requesting party user is authorized to access the universal profile based on the access permission data, fulfilling the form content request by the computer server including:

obtaining the form content data from the universal profile using the mapping of the form template to the universal profile data structure; and provisioning access to the form content data to the requesting party user device via the first network connection.

14. The method of claim 13, wherein the confirming the data owner permission comprises:

receiving an authorization from the data owner user device at the computer server; or referencing, by the computer server, a preexisting permission previously provided by the data owner device and stored by the computer server.

15. The method of claim 13, wherein the provisioning access to the form content data includes verifying the form content data at the computer server according to a set of predetermined verification rules and sending a verification confirmation from the computer server to the relying party user device.

16. The method of claim 13, wherein the provisioning access to the form content data includes auto populating the form template with the form content data to generate a completed form.

17. The method of claim 13, wherein the provisioning access to the form content data includes providing the form content data to the requesting party user in a format directly consumable by a data processing system of the requesting party using the form mapping.

18. The method of claim 13, further comprising:

determining and storing a completion state of the universal profile;

comparing required form content data for the form template to the completion state of the universal profile to determine if any of the required form content data is absent from the universal profile instance; and sending a request for the absent form content data to the data owner device.

19. The method of claim 18, further comprising:

receiving, at the computer server, universal profile population input data corresponding to the absent form content data from the data owner device;

updating, by the computer server, the universal profile using the universal profile population input data; and fulfilling the form content request using the updated universal profile by the computer server.

20. A computer system for processing digital forms, the computer system comprising one or more processors configured to:

generate and store in a data storage device accessible to the one or more processors a form mapping of a form template to a universal profile data structure, the form template comprising a plurality of form fields for collecting form content data;

storing, in the data storage device, a universal profile of a data owner user, the universal profile comprising an instance of the universal profile data structure;

receive a form content request from a requesting party user device associated with a requesting party user via a first network connection, the form content request specifying the data owner user, the requesting party user, and the form template, the requesting party user and the data owner user being different entities;

receive, via a second network connection, access permission data from a data owner user device associated with the the data owner user authorizing the requesting party user to access the universal profile of the data owner user to obtain form content data corresponding to the form template;

determine, based on the access permission data, that the requesting party user specified in the form content request is authorized to access the universal profile of the data owner user specified in the form content request to obtain the form content data for the form template specified in the form content request; and upon confirming that the requesting party is authorized to access the universal profile based on the access permission data, fulfill the form content request including obtaining the form content data from the universal profile using the form mapping and provisioning access to the form content data to the requesting party user device via the first network connection.

* * * * *